United States Patent
Boydston et al.

(10) Patent No.: US 10,273,327 B2
(45) Date of Patent: Apr. 30, 2019

(54) METATHESIS POLYMERIZATION METHODS

(71) Applicant: University of Washington, Seattle, WA (US)

(72) Inventors: Andrew J. Boydston, Seattle, WA (US); Kelli Ogawa, Seattle, WA (US); Adam E. Goetz, Seattle, WA (US); Damian Dunford, Seattle, WA (US); Laura Marie Murphy Pascual, Seattle, WA (US)

(73) Assignee: University of Washington, Seattle, WA (US)

( * ) Notice: Subject to any disclaimer, the term of this patent is extended or adjusted under 35 U.S.C. 154(b) by 40 days.

(21) Appl. No.: 15/506,578

(22) PCT Filed: Sep. 3, 2015

(86) PCT No.: PCT/US2015/048395
§ 371 (c)(1),
(2) Date: Feb. 24, 2017

(87) PCT Pub. No.: WO2016/036976
PCT Pub. Date: Mar. 10, 2016

(65) Prior Publication Data
US 2017/0240695 A1    Aug. 24, 2017

Related U.S. Application Data

(60) Provisional application No. 62/171,735, filed on Jun. 5, 2015, provisional application No. 62/136,069, filed on Mar. 20, 2015, provisional application No. 62/101,263, filed on Jan. 8, 2015, provisional application No. 62/045,271, filed on Sep. 3, 2014.

(51) Int. Cl.
*C08G 61/08*     (2006.01)
*C08G 61/12*     (2006.01)

(52) U.S. Cl.
CPC ............ *C08G 61/08* (2013.01); *C08G 61/12* (2013.01); *C08G 61/125* (2013.01); *C08G 2261/135* (2013.01); *C08G 2261/142* (2013.01); *C08G 2261/144* (2013.01); *C08G 2261/1422* (2013.01); *C08G 2261/1424* (2013.01); *C08G 2261/3322* (2013.01); *C08G 2261/3324* (2013.01); *C08G 2261/3325* (2013.01); *C08G 2261/3342* (2013.01); *C08G 2261/42* (2013.01); *C08G 2261/44* (2013.01); *C08G 2261/76* (2013.01); *C08G 2261/80* (2013.01)

(58) Field of Classification Search
CPC .................. G08G 61/08; G08G 61/125; G08G 2261/3322; G08G 2261/44; G08G 2261/3342; G08G 2261/3324; G08G 2261/135; G08G 2261/1424; G08G 2261/3325; G08G 2261/42; G08G 2261/76
USPC ......... 526/280, 281; 522/184, 185, 187, 186
See application file for complete search history.

(56) References Cited

U.S. PATENT DOCUMENTS

| 7,728,090 B2 | 6/2010 | Liaw et al. |
| 2011/0151566 A1 | 6/2011 | Hedrick et al. |
| 2014/0378574 A1 | 12/2014 | Molnar et al. |

FOREIGN PATENT DOCUMENTS

| WO | 2005/092598 A1 | 10/2005 |
| WO | 2009/003711 A2 | 1/2009 |
| WO | 2014/022454 A1 | 2/2014 |
| WO | 2016/036976 A1 | 3/2016 |

OTHER PUBLICATIONS

Pruitt et al. Polymeric biomaterials for load-bearing mefical devices. J. JOM (2009) 61: 14. [online]. Retrieved online [Jun. 10, 2018]. Retrived from <URL:// https://doi.org/10.1007/s11837-009-0126-3> (Year: 2009).*
Dove. "Organic Catalysis for Ring-Opening Polymerization." ACS Macro Letters (1), 1409-1412, 2012. <URL: http://pubs.acs.org/doi/pdf/10.1021/mz3005956>.
Ogawa et al. "Metal-Free Ring-Opening Metathesis Polymerization." Journal of the American Chemical Society 137(4):1400-1403, 2015. <URL: http://cdn-pubs.acs.org/doi/pdfplus/10.1021/ja512073m>.
International Search Report and Written Opinion dated Dec. 4, 2015, issued in corresponding International Application No. PCT/US2015/048395, filed Sep. 3, 2015, 10 pages.
Wong et al. "Phototriggered, Metal-Free Continuous Assembly of Polymers for the Fabrication of Ultrathin Films." ACS Macro Letters (1), 1020-1023, 2012. <URL: http://www.researchgate.net/profile/Edgar_Wong/publication/263940405_Phototriggered_Metal-Free_Continuous_Assembly_of_Poylmers_for_the_Fabrication_of-Ultrathin_Films/links/5464632e0cf2837efdb35684.pdf>.

(Continued)

*Primary Examiner* — Sanza L. McClendon
(74) *Attorney, Agent, or Firm* — Christensen O'Connor Johnson Kindness PLLC

(57) ABSTRACT

The present disclosure is directed to methods of making a polymer, including exposing a reaction mixture including a strained cyclic unsaturated monomer and an organic initiator to a stimulus to provide an activated organic initiator, whereby the activated organic initiator is effective to polymerize the strained cyclic unsaturated monomer via a 4-membered carbocyclic intermediate to provide a polymer having constitutional units derived from the strained cyclic unsaturated monomer.

20 Claims, 6 Drawing Sheets

(56) References Cited

OTHER PUBLICATIONS

Yamaguchi et al. "Green Poylmer Chemistry: Lipase-Catalyzed Synthesis of Bio-Based Reactive Polyesters Employing Itaconic Anhydride as a Renewable Monomer." Polymer Journal 46: 2-13, 2014, The Society of Polymer Science, Japan <URL: http://search.proquest.com/docview/1474308519/36CD9OCF51B94795PQ/1?accountid=142944>.
International Preliminary Report on Patentability dated Mar. 16, 2017, issued in corresponding International Application No. PCT/US2015/048395, filed Sep. 3, 2015, 8 pages.
Wu, X., et al., "Substituent Effects on the Redox Properties and Structure of Substituted Triphenylamines. An Experimental and Computational Study," Tetrahedron 65(12):2408-2414, Mar. 2009.
Xu, J., et al., "Aqueous Photoinduced Living/Controlled Polymerization: Tailoring for Bioconjugation," Chemical Science 5(9):3568-3575, Sep. 2014.
Xu, J., et al., "Oxygen Tolerance Study of Photoinduced Electron Transfer—Reversible Addition—Fragmentation Chain Transfer (PET-RAFT) Polymerization Mediated by Ru(bpy)3C12," Macromolecules 47(13):4217-4229, Jul. 2014.
Xu, J., et al., "A Robust and Versatile Photoinduced Living Polymerization of Conjugated and Unconjugated Monomers and Its Oxygen Tolerance," Journal of the American Chemical Society 136(14):5508-5519, Apr. 2014.
Ye, J., et al., "Selective C—C Bond Cleavage of Cyclopentadiene Rings Assisted by Ferric Chloride to Synthesize Water-Soluble Pyrylium Salts," RSC Advances 3(22):8232-8235, Jun. 2013.
Alcaide, B., et al., "Grubbs' Ruthenium-Carbenes Beyond the Metathesis Reaction: Less Conventional Non-Metathetic Utility," Chemical Reviews 109(8):3817-3858, Aug. 2009.
Bielawski, C.W., and R.H. Grubbs, "Living Ring-Opening Metathesis Polymerization," Progress in Polymer Science 32(1):1-29, Jan. 2007.
Braunecker, W.A., and K. Matyjaszewski, "Controlled/Living Radical Polymerization: Features, Developments and Perspectives," Progress in Polymer Science 32(1):93-146, Jan. 2007.
Breslow, D.S., "Metathesis Polymerization," Progress in Polymer Science 18(6):1141-1195, 1993.
Cannizzo, L.F., and R.H. Grubbs, "Block Copolymers Containing Monodisperse Segments Produced by Ring-Opening Metathesis of Cyclic Olefins," Macromolecules 21(7):1961-1967, Jul. 1988.
Chauvin, Y., "Olefin Metathesis: The Early Days (Nobel Lecture)," Angewandte Chemie (International Edition) 45(23):3740-3747, Jun. 2006.
Chiba, K., et al., "Electrocatalytic Intermolecular Olefin Cross-Coupling by Anodically Induced Formal [2+2] Cycloaddition between Enol Ethers and Alkenes," Journal of the American Chemical Society 123(45):11314-11315, Nov. 2001.
Choi, T.-L., and R.H. Grubbs, "Controlled Living Ring-Opening-Metathesis Polymerization by a Fast-Initiating Ruthenium Catalyst," Angewandte Chemie (International Edition) 42(15):1743-1746, Apr. 2003.
Connelly, N.G., and W.E. Geiger, "Chemical Redox Agents for Organometallic Chemistry," Chemical Reviews 96(2):877-910, Mar. 1996.
Davidson, T.A., and K.B. Wagener, "The Polymerization of Dicyclopentadiene: An Investigation of Mechanism," Journal of Molecular Catalysis A: Chemical 133(1-2):67-74, Jul. 1988.
Davidson, T.A., et al., "Polymerization of Dicyclopentadiene: A Tale of Two Mechanisms," Macromolecules 29(2):786-788, Jan. 1996.
Du, J., et al., "A Dual-Catalysis Approach to Enantioselective [2+2] Photocycloadditions Using Visible Light," Science 344(6182):392-396, Apr. 2014.
Fisher, R.A., and R.H. Grubbs, "Ring-Opening Metathesis Polymerization of exo-Dicyclopentadiene: Reversible Crosslinking by a Metathesis Catalyst," Makromolekulare Chemie. Macromolecular Symposia 63(1):271-277, Oct. 1992.

Forrest, W.P., et al., "Tungsten Oxo Alkylidene Complexes as Initiators for the Stereoregular Polymerization of 2,3-Dicarbomethoxynorbornadiene," Organometallics 33(9):2313-2325, May 2014.
Fors, B.P., and C.J. Hawker, "Control of a Living Radical Polymerization of Methacrylates by Light," Angewandte Chemie (International Edition) 51(35):8850-8853, Aug. 2012.
Fukuzumi, S., et al., "Electron-Transfer State of 9-Mesityl-10-methylacridinium Ion With a Much Longer Lifetime and Higher Energy Than That of the Natural Photosynthetic Reaction Center," Journal of the American Chemical Society 126(6):1600-1601, Feb. 2004.
Gesmundo, N.J., et al., "Cyclization-Endoperoxidation Cascade Reactions of Dienes Mediated by a Pyrylium Photoredox Catalyst," Beilstein Journal of Organic Chemistry 10:1272-1281, Jun. 2014.
Griffith, A.K., et al., "Organocatalytic Carbonyl-Olefin Metathesis," Journal of the American Chemical Society 134(45):18581-18584, Nov. 2012.
Grubbs, R.H., "Olefin-Metathesis Catalysts for the Preparation of Molecules and Materials (Nobel Lecture)," Angewandte Chemie (International Edition) 45(23):3760-3765, Jun. 2006.
Haselwander, T.F.A., et al., "Polynorbornene: Synthesis, Properties and Simulations," Macromolecular Chemistry and Physics 197(10):3435-3453, Oct. 1996.
Hayano, S., et al., "Stereospecific Ring-Opening Metathesis Polymerization of Cycloolefins Using Novel Molybdenum and Tungsten Complexes Having Biphenolate Ligands: Development of Crystalline Hydrogenated Poly(endo-dicyclopentadiene) and Poly(norbornene)," Macromolecules 36(20):7422-7431, Oct. 2003.
Hoyle, C.E., and C.N. Bowman, "Thiol-Ene Click Chemistry," Angewandte Chemie (International Edition) 49(9):1540-1573, Feb. 2010.
Hoyle, C.E., et al., "Thiol-Click Chemistry: A Multifaceted Toolbox for Small Molecule and Polymer Synthesis," Chemical Society Reviews 39(4):1355-1387, Apr. 2010.
Jeong, H., et al., "Z-Selective Ring-Opening Metathesis Polymerization of 3-Substituted Cyclooctenes by Monoaryloxide Pyrrolide Imido Alkylidene (MAP) Catalysts of Molybdenum and Tungsten," Organometallics 32(17):4843-4850, Sep. 2013.
Lauer, M.G., et al., "Palladium-Catalyzed Reactions of Enol Ethers: Access to Enals, Furans, and Dihydrofurans," Organic Letters 14(23):6000-6003, Dec. 2012.
Lowe, A.B., "Thiol-ene 'Click' Reactions and Recent Applications in Polymer and Materials Synthesis," Polymer Chemistry 1(1):17-36, Mar. 2010.
Lu, Z., and T.P. Yoon, "Visible Light Photocatalysis of [2+2] Styrene Cycloadditions by Energy Transfer," Angewandte Chemie (International Edition) 51(41):10329-10332, Oct. 2012.
Martiny, M., et al., "Cycloaddition Reactions Initiated by Photochemically Excited Pyrylium Salts," Chemische Berichte 126(7):1671-1682, Jul. 1993.
Masjedizadeh, M.R., et al., "Linearly Fused vs Bridged Regioselection in the Intramolecular 1,3-Diyl Trapping Reaction," Journal of Organic Chemistry 55(9):2742-2752, Apr. 1990.
Miura, T., et al., "Electrochemical Enol Ether/Olefin Cross-Metathesis in a Lithium Perchlorate/Nitromethane Electrolyte Solution," Angewandte Chemie (International Edition) 45(9):1461-1463, Feb. 2006.
Miyashi, T., et al., "Evidence for a Chair Cyclohexane 1,4-Radical Cation Intermediate in the Single Electron Transfer Induced Cope Rearrangement of 2,5-Diaryl-1,5-hexadienes," Journal of the American Chemical Society 110(11):3676-3677, May 1988.
Mol, J.C., "Industrial Applications of Olefin Metathesis," Journal of Molecular Catalysis A: Chemical 213(1):39-45, Apr. 2004.
Neff, J.R., and J.E. Nordlander, "Synthesis of 4-Tetracyclo[5.2.1.0(2,6).0(3,8)]decene (2,4-Ethenotricyclo[3.3.0.0(3,7)]octane)," Journal of Organic Chemistry 41(15):2590-2596, Jul. 1976.
Nelson, G.L., and C.-L. Kuo, "An Improved Procedure for the Preparation of exo-Dicyclopentadiene," Synthesis 1975(2):105-106, Feb. 1975.
Nicewicz, D.A., and T.M. Nguyen, "Recent Applications of Organic Dyes as Photoredox Catalysts in Organic Synthesis," ACS Catalysis 4(1):355-360, Jan. 2014.

(56) References Cited

OTHER PUBLICATIONS

Parrish, J.D., et al., "Endoperoxide Synthesis by Photocatalytic Aerobic [2+2+2] Cycloadditions," Organic Letters 14(6):1640-1643, Mar. 2012.

Peruch, F., et al., "Homopolymerization and Copolymerization of Styrene and Norbonene With Ni-Based/MAO Catalysts," Macromolecular Chemistry and Physics 199(10):2221-2227, Oct. 1998.

Poelma, J.E., et al., "Fabrication of Complex Three-Dimensional Polymer Brush Nanostructures Through Light-Mediated Living Radical Polymerization," Angewandte Chemie (International Edition) 52(27):6844-6848, Jul. 2013.

Raies-Zadeh, M., and P.A. Kohl, "High-Contrast, High Sensitivity Aqueous Base-Developable Polynorbornene Dielectric," Journal of Applied Polymer Science 127(6):4366-4373, Mar. 2013.

Riener, M., and D.A. Nicewicz, "Synthesis of Cyclobutane Lignans via an Organic Single Electron Oxidant-Electron Relay System," Chemical Science 4(6):2625-2629, Jun. 2013.

Rosebrugh, L.E., et al., "Synthesis of Highly Cis, Syndiotactic Polymers via Ring-Opening Metathesis Polymerization Using Ruthenium Metathesis Catalysts," Journal of the American Chemical Society 135(27):10032-10035, Jul. 2013.

Rule, J.D., and J.S. Moore, "ROMP Reactivity of endo- and exo-Dicyclopentadiene," Macromolecules 35(21):7878-7882, Oct. 2002.

Sanford, M.S., et al., "Mechanism and Activity of Ruthenium Olefin Metathesis Catalysts," Journal of the American Chemical Society 123(27):6543-6554, Jul. 2001.

Schrock, R.R., "Synthesis of Stereoregular Polymers Through Ring-Opening Metathesis Polymerization," Accounts of Chemical Research 47(8):2457-2466, Aug. 2014.

Schrock, R.R., "Multiple Metal-Carbon Bonds for Catalytic Metathesis Reactions (Nobel Lecture)," Angewandte Chemie (International Edition) 45(23):3748-3759, Jun. 2006.

Schultz, D.M., and T.P. Yoon, "Solar Synthesis: Prospects in Visible Light Photocatalysis," Science 343(6174):1239176-1-1239176-8, Feb. 2014.

Shanmugam, S., et al., "Photoinduced Electron Transfer—Reversible Addition—Fragmentation Chain Transfer (PET-RAFT) Polymerization of Vinyl Acetate and N-Vinylpyrrolidinone: Kinetic and Oxygen Tolerance Study," Macromolecules 47(15):4930-4942, Aug. 2014.

Sutthasupa, S., et al., "Recent Advances in Ring-Opening Metathesis Polymerization, and Application to Synthesis of Functional Materials," Polymer Journal 42(12):905-915, Dec. 2010.

VanAllan, J.A., and G.A. Reynolds, "The Preparation of Certain Pyrylium Salts by Using Chalcone and Boron Trifluoride Etherate," Journal of Organic Chemistry 33(3):1102-1105, Mar. 1968.

Vougiokalakis, G.C., "Removing Ruthenium Residues From Olefin Metathesis Reaction Products," Chemistry—A European Journal 18(29):8868-8880, Jul. 2012.

\* cited by examiner

METATHESIS POLYMERIZATION METHODS

CROSS-REFERENCES TO RELATED APPLICATIONS

This application is a National Stage of PCT/US2015/048395, filed on Sep. 3, 2015, which claims the benefit of U.S. Patent Application No. 62/045,271, filed Sep. 3, 2014; U.S. Patent Application No. 62/101,263, filed Jan. 8, 2015; U.S. Patent Application No. 62/136,069, filed Mar. 20, 2015; and U.S. Patent Application No. 62/171,735, filed Jun. 5, 2015; the disclosures of which are hereby incorporated by reference in their entirety.

GOVERNMENT LICENSE RIGHTS

This invention was made with government support under Grant No. W911NF-15-1-0139 awarded by the Army Research Office. The government has certain rights in the invention.

BACKGROUND

Ring-opening metathesis polymerization (ROMP) is a popular method for the preparation of a variety of functional polymers and is one of the most prevalent technologies that has emerged from the development of transition metal-based olefin metathesis catalysts. Applications in areas such as drug delivery, biomedical engineering, photovoltaics, and production of structural materials have each benefited from developments in ROMP methods. In general, ROMP is used to achieve living polymerizations, to provide polymers of narrow dispersity, to enable control over end group functionality, and to incorporate a broad range of functional groups into polymer scaffolds and network materials.

Traditional ROMP initiators include transition metal complexes, such as Ru, W, or Mo-alkylidene complexes, along with a number of ill-defined species containing various mixtures of metal salts. Examples of Ru-, Mo-, and W-based alkylidene initiators are shown in Scheme 1 below.

Scheme 1. Transition metal ROMP catalysts.

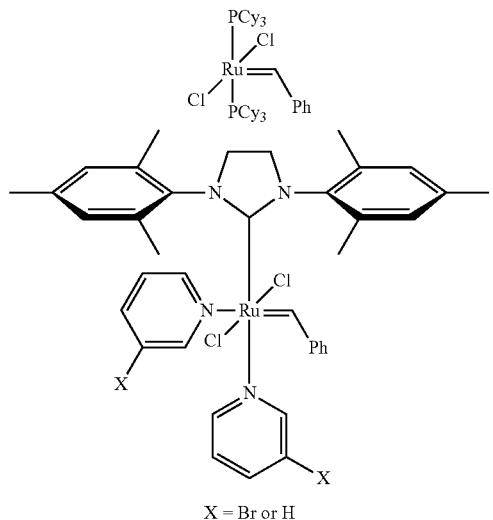

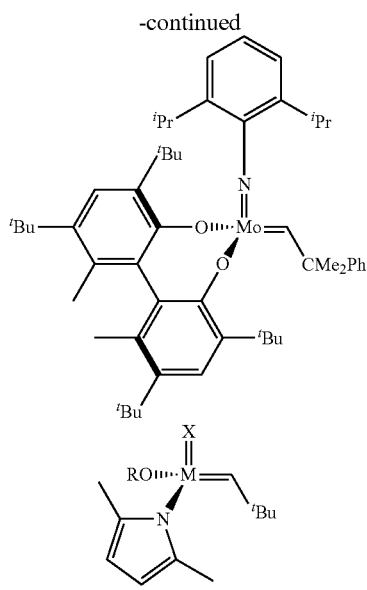

M = Mo or W; X = NR' or O

It is believed that each of these initiators proceeds through the same general mechanism involving a metallacyclobutane intermediate as shown in Scheme 2, below, where M is a metal and R is a substituent.

Scheme 2. Mechanism for metal catalyst mediated ROMP.

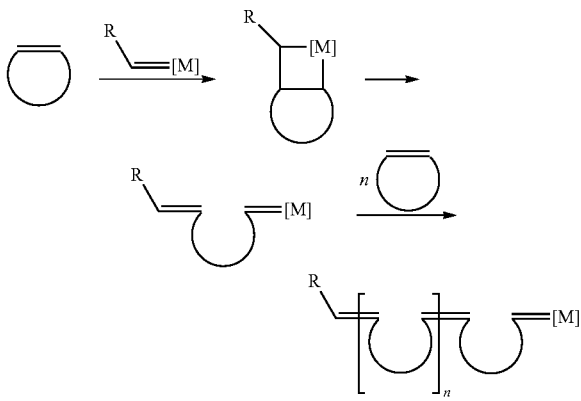

Despite the positive attributes that traditional transition metal catalysts can provide to a ROMP process, a significant disadvantage common to transition metal-catalyzed ROMP is that metal-based byproducts can be difficult to remove from the polymeric materials. This can lead to complications with biological studies, conductivity measurements, or optical properties. Moreover, downstream reactivity of residual metallic species can also be problematic. At a minimum, the potential for metal contaminants often warrants quantitation by advanced techniques, such as inductively-coupled plasma mass spectrometry. Indeed, these issues have motivated a number of protocols for removing metal-based components, which, even when successful, add additional processing steps for material production.

Thus, there is presently a need for polymerization using organic initiators, for cross-linking reactions that do not require metal catalysts, and for reaction products that do not have trapped metals. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, this disclosure features a method of making a polymer including exposing a reaction mixture including a strained cyclic unsaturated monomer and an organic initiator to a stimulus to provide an activated organic initiator, whereby the activated organic initiator is effective to polymerize the strained cyclic unsaturated monomer, to provide a polymer having constitutional units derived from the strained cyclic unsaturated monomer.

In another aspect, this disclosure features a method of making a polymer including exposing a reaction mixture including a strained cyclic unsaturated monomer, an organic unsaturated initiator, and a co-initiator, to a stimulus to provide an activated co-initiator which activates the organic unsaturated initiator, whereby the activated organic unsaturated initiator is effective to polymerize the strained cyclic unsaturated monomer, to provide a polymer having constitutional units derived from the strained cyclic unsaturated monomer.

In yet another aspect, this disclosure features a polymer, including an alkenyl substituted with a $C_1$-$C_{20}$ alkoxy moiety at a polymer terminus and wherein the polymer is metal-free.

In yet another aspect, this disclosure features an article of manufacture, including the polymer produced by any of the methods above.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1A:
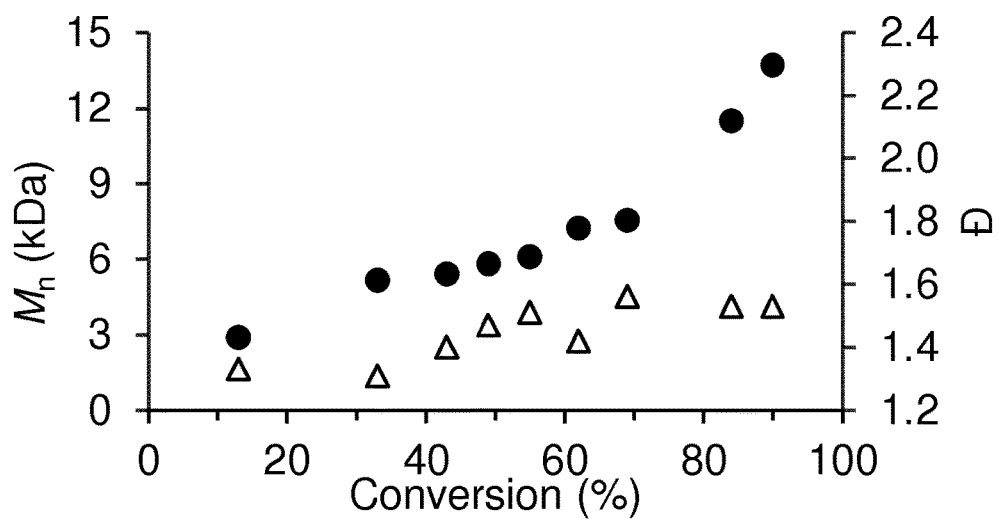
FIGS. 1A and 1B are graphs showing $M_n$ (circles) and Đ (triangles) vs % conversion of an embodiment of a monomer using initial monomer to initiator 1:2c ratio of 100:1 (FIG. 1A) and 500:1 (FIG. 1B).

The present disclosure is directed to methods of making a polymer, including exposing a reaction mixture including a strained cyclic unsaturated monomer and an organic initiator to a stimulus to provide an activated organic initiator, whereby the activated organic initiator is effective to polymerize the strained cyclic unsaturated monomer via a 4-membered carbocyclic intermediate to provide a polymer having constitutional units derived from the strained cyclic unsaturated monomer. The 4-membered carbocyclic intermediate can be formed by a [2+2] cycloaddition of the activated organic initiator and the strained cyclic unsaturated monomer.

The ROMP process can occur in a metal-free manner, using organic initiators that are metal-free. Thus, the resulting polymers can be metal-free. Without wishing to be bound by theory, it is believed that the polymerization process outcompetes reductive quenching reactions that may occur during the reaction, which otherwise afford cyclobutanes in a single olefin cross-methathesis reaction rather than a desired polymer by a polymerization propagation reaction.

The ROMP process and resulting polymers of the present disclosure have numerous advantages, such as obviating the need for removing metal-based components from polymers, providing polymerization processes that offer unique control over polymer end group functionality, providing polymers having certain main chain microstructures, and providing methods for spatiotemporal control over polymer production.

Definitions

At various places in the present specification, substituents of compounds of the disclosure are disclosed in groups or in ranges. It is specifically intended that the disclosure include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

It is further appreciated that certain features of the disclosure, which are, for clarity, described in the context of separate embodiments, can also be provided in combination in a single embodiment.

Conversely, various features of the disclosure which are, for brevity, described in the context of a single embodiment, can also be provided separately or in any suitable subcombination.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Furthermore, references have been made to patents and printed publications throughout this specification. Each of the above-cited references and printed publications are individually incorporated herein by reference in their entirety.

As used herein, the term "substituted" or "substitution" refers to the replacing of a hydrogen atom with a substituent other than H. For example, an "N-substituted piperidin-4-yl" refers to replacement of the H atom from the NH of the piperidinyl with a non-hydrogen substituent such as, for example, alkyl.

Terms used herein may be preceded and/or followed by a single dash, "—", or a double dash, "=", to indicate the bond order of the bond between the named substituent and its parent moiety; a single dash indicates a single bond and a double dash indicates a double bond. In the absence of a single or double dash it is understood that a single bond is formed between the substituent and its parent moiety; further, substituents are intended to be read "left to right" unless a dash indicates otherwise. For example, $C_1$-$C_6$alkoxycarbonyloxy and —OC(O)$C_1$-$C_6$alkyl indicate the same functionality; similarly arylalkyl and -alkylaryl indicate the same functionality.

As used herein, the term "alkyl" refers to a straight or branched chain hydrocarbon containing from 1 to 10 carbon atoms, unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

As used herein, the term "alkylene" refers to a linking alkyl group. The linking alkyl group can be a straight or branched chain; examples include, but are not limited to —$CH_2$—, —$CH_2CH_2$—, —$CH_2CH_2CHC(CH_3)$—, and —$CH_2CH(CH_2CH_3)CH_2$—.

As used herein, the term "alkenyl" refers to a straight or branched chain hydrocarbon containing from 2 to 10 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl.

As used herein, the term "alkenylene" refers to a linking alkenyl group.

As used herein, the term "alkynyl" refers to a straight or branched chain hydrocarbon group containing from 2 to 10 carbon atoms and containing at least one carbon-carbon triple bond. Representative examples of alkynyl include, but are not limited to, acetylenyl, 1-propynyl, 2-propynyl, 3-butynyl, 2-pentynyl, and 1-butynyl.

As used herein, "alkynylene" refers to a linking alkynyl group.

As used herein, the term "aryl" refers to a phenyl (i.e., monocyclic aryl), a bicyclic ring system containing at least one phenyl ring or an aromatic bicyclic ring containing only carbon atoms in the aromatic bicyclic ring system or a multicyclic aryl ring system, provided that the bicyclic or multicyclic aryl ring system does not contain a heteroaryl ring when fully aromatic. The bicyclic aryl can be azulenyl, naphthyl, or a phenyl fused to a monocyclic cycloalkyl, a monocyclic cycloalkenyl, or a monocyclic heterocyclyl. The bicyclic aryl is attached to the parent molecular moiety through any carbon atom contained within the phenyl portion of the bicyclic system, or any carbon atom with the naphthyl or azulenyl ring. The fused monocyclic cycloalkyl or monocyclic heterocyclyl portions of the bicyclic aryl are optionally substituted with one or two oxo and/or thia groups. Representative examples of the bicyclic aryls include, but are not limited to, azulenyl, naphthyl, dihydroinden-1-yl, dihydroinden-2-yl, dihydroinden-3-yl, dihydroinden-4-yl, 2,3-dihydroindol-4-yl, 2,3-dihydroindol-5-yl, 2,3-dihydroindol-6-yl, 2,3-dihydroindol-7-yl, inden-1-yl, inden-2-yl, inden-3-yl, inden-4-yl, dihydronaphthalen-2-yl, dihydronaphthalen-3-yl, dihydronaphthalen-4-yl, dihydronaphthalen-1-yl, 5,6,7,8-tetrahydronaphthalen-1-yl, 5,6,7,8-tetrahydronaphthalen-2-yl, 2,3-dihydrobenzofuran-4-yl, 2,3-dihydrobenzofuran-5-yl, 2,3-dihydrobenzofuran-6-yl, 2,3-dihydrobenzofuran-7-yl, benzo[d][1,3]dioxol-4-yl, benzo[d][1,3]dioxol-5-yl, 2H-chromen-2-on-5-yl, 2H-chromen-2-on-6-yl, 2H-chromen-2-on-7-yl, 2H-chromen-2-on-8-yl, isoindoline-1,3-dion-4-yl, isoindoline-1,3-dion-5-yl, inden-1-on-4-yl, inden-1-on-5-yl, inden-1-on-6-yl, inden-1-on-7-yl, 2,3-dihydrobenzo[b][1,4]dioxan-5-yl, 2,3-dihydrobenzo[b][1,4]dioxan-6-yl, 2H-benzo[b][1,4]oxazin3(4H)-on-5-yl, 2H-benzo[b][1,4]oxazin3(4H)-on-6-yl, 2H-benzo[b][1,4]oxazin3(4H)-on-7-yl, 2H-benzo[b][1,4]oxazin3(4H)-on-8-yl, benzo[d]oxazin-2(3H)-on-5-yl, benzo[d]oxazin-2(3H)-on-6-yl, benzo[d]oxazin-2(3H)-on-7-yl, benzo[d]oxazin-2(3H)-on-8-yl, quinazolin-4(3H)-on-5-yl, quinazolin-4(3H)-on-6-yl, quinazolin-4(3H)-on-7-yl, quinazolin-4(3H)-on-8-yl, quinoxalin-2(1H)-on-5-yl, quinoxalin-2(1H)-on-6-yl, quinoxalin-2(1H)-on-7-yl, quinoxalin-2(1H)-on-8-yl, benzo[d]thiazol-2(3H)-on-4-yl, benzo[d]thiazol-2(3H)-on-5-yl, benzo[d]thiazol-2(3H)-on-6-yl, and, benzo[d]thiazol-2(3H)-on-7-yl. In certain embodiments, the bicyclic aryl is (i) naphthyl or (ii) a phenyl ring fused to either a 5 or 6 membered monocyclic cycloalkyl, a 5 or 6 membered monocyclic cycloalkenyl, or a 5 or 6 membered monocyclic heterocyclyl, wherein the fused cycloalkyl, cycloalkenyl, and heterocyclyl groups are optionally substituted with one or two groups which are independently oxo or thia. Multicyclic aryl groups are a phenyl ring (base ring) fused to either (i) one ring system selected from the group consisting of a bicyclic aryl, a bicyclic cycloalkyl, a bicyclic cycloalkenyl, and a bicyclic heterocyclyl; or (ii) two other ring systems independently selected from the group consisting of a phenyl, a bicyclic aryl, a monocyclic or bicyclic cycloalkyl, a monocyclic or bicyclic cycloalkenyl, and a monocyclic or bicyclic heterocyclyl, provided that when the base ring is fused to a bicyclic cycloalkyl, bicyclic cycloalkenyl, or bicyclic heterocyclyl, then the base ring is fused to the base ring of the a bicyclic cycloalkyl, bicyclic cycloalkenyl, or bicyclic heterocyclyl. The multicyclic aryl is attached to the parent molecular moiety through any carbon atom contained within the base ring. In certain embodiments, multicyclic aryl groups are a phenyl ring (base ring) fused to either (i) one ring system selected from the group consisting of a bicyclic aryl, a bicyclic cycloalkyl, a bicyclic cycloalkenyl, and a bicyclic heterocyclyl; or (ii) two other ring systems independently selected from the group consisting of a phenyl, a monocyclic cycloalkyl, a monocyclic cycloalkenyl, and a monocyclic heterocyclyl, provided that when the base ring is fused to a bicyclic cycloalkyl, bicyclic cycloalkenyl, or bicyclic heterocyclyl, then the base ring is fused to the base ring of the a bicyclic cycloalkyl, bicyclic cycloalkenyl, or bicyclic heterocyclyl. Examples of multicyclic aryl groups include but are not limited to anthracen-9-yl and phenanthren-9-yl.

As used herein, the term "arylene" refers to a linking aryl group.

As used herein, the term "cycloalkyl" refers to a monocyclic, bicyclic, or a multicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloalkyl ring where two non-adjacent carbon atoms of the monocyclic ring are linked by an alkylene bridge of between one and three additional carbon atoms (i.e., a bridging group of the form $—(CH_2)_w—$, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring. Cycloalkyl groups are optionally substituted with one or two groups which are independently oxo or thia. In certain embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thia. Multicyclic cycloalkyl ring systems are a monocyclic cycloalkyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two other rings systems independently selected from the group consisting of a phenyl, a bicyclic aryl, a monocyclic or bicyclic heteroaryl, a monocyclic or bicyclic cycloalkyl, a monocyclic or bicyclic cycloalkenyl, and a monocyclic or bicyclic heterocyclyl. The multicyclic cycloalkyl is attached to the parent molecular moiety through any carbon atom contained within the base ring. In certain embodiments, multicyclic cycloalkyl ring systems are a monocyclic cycloalkyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two other rings systems independently selected from the group consisting of a phenyl, a monocyclic heteroaryl, a monocyclic cycloalkyl, a monocyclic cycloalkenyl, and a monocyclic heterocyclyl. Examples of multicyclic cycloalkyl groups include, but are not limited to tetradecahydrophenanthrenyl, perhydrophenothiazin-1-yl, and perhydrophenoxazin-1-yl.

As used herein, "cycloalkylene" refers to a linking cycloalkyl group.

As used herein, "cycloalkenyl" refers to a monocyclic, bicyclic, or a multicyclic cycloalkenyl ring system. Monocyclic ring systems are cyclic hydrocarbon groups containing from 3 to 8 carbon atoms, where such groups are unsaturated (i.e., containing at least one annular carbon-carbon double bond), but not aromatic. Examples of monocyclic ring systems include cyclopentenyl and cyclohexenyl. Bicyclic cycloalkenyl rings are bridged monocyclic rings or fused bicyclic rings. Bridged monocyclic rings contain a monocyclic cycloalkenyl ring where two non-adjacent carbon atoms of the monocyclic ring are linked by an alkylene bridge of between one and three additional carbon atoms (i.e., a bridging group of the form $—(CH_2)_w—$, where w is 1, 2, or 3). Representative examples of bicyclic cycloalkenyls include, but are not limited to, norbornenyl and bicyclo[2.2.2]oct-2-enyl. Fused bicyclic cycloalkenyl ring systems contain a monocyclic cycloalkenyl ring fused to either a phenyl, a monocyclic cycloalkyl, a monocyclic cycloalkenyl, a monocyclic heterocyclyl, or a monocyclic heteroaryl. The bridged or fused bicyclic cycloalkenyl is attached to the parent molecular moiety through any carbon atom contained within the monocyclic cycloalkenyl ring. Cycloalkenyl groups are optionally substituted with one or two groups which are independently oxo or thia. Multicyclic cycloalkenyl rings contain a monocyclic cycloalkenyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two rings systems independently selected from the group consisting of a phenyl, a bicyclic aryl, a monocyclic or bicyclic heteroaryl, a monocyclic or bicyclic cycloalkyl, a monocyclic or bicyclic cycloalkenyl, and a monocyclic or bicyclic heterocyclyl. The multicyclic cycloalkenyl is attached to the parent molecular moiety through any carbon atom contained within the base ring. In certain embodiments, multicyclic cycloalkenyl rings contain a monocyclic cycloalkenyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two rings systems independently selected from the group consisting of a phenyl, a monocyclic heteroaryl, a monocyclic cycloalkyl, a monocyclic cycloalkenyl, and a monocyclic heterocyclyl.

As used herein, "cycloalkenylene" refers to a linking cycloalkenyl group.

As used herein, the term "heteroaryl" refers to a monocyclic, bicyclic, or a multicyclic heteroaryl ring system. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. Representative examples of monocyclic heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, and triazinyl. The bicyclic heteroaryl consists of a monocyclic heteroaryl fused to a phenyl, a monocyclic cycloalkyl, a monocyclic cycloalkenyl, a monocyclic heterocyclyl, or a monocyclic heteroaryl. The fused cycloalkyl or heterocyclyl portion of the bicyclic heteroaryl group is optionally substituted with one or two groups which are independently oxo or thia. When the bicyclic heteroaryl contains a fused cycloalkyl, cycloalkenyl, or heterocyclyl ring, then the bicyclic heteroaryl group is connected to the parent molecular moiety through any carbon or nitrogen atom contained within the monocyclic heteroaryl portion of the bicyclic ring system. When the bicyclic heteroaryl is a monocyclic heteroaryl fused to a phenyl ring or a monocyclic heteroaryl, then the bicyclic heteroaryl group is connected to the parent molecular moiety through any carbon atom or nitrogen atom within the bicyclic ring system. Representative examples of bicyclic heteroaryl include, but are not limited to, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, purinyl, 5,6,7,8-tetrahydroquinolin-2-yl, 5,6,7,8-tetrahydroquinolin-3-yl, 5,6,7,8-tetrahydroquinol-4-yl, 5,6,7,8-tetrahydroisoquinolin-1-yl, thienopyridinyl, 4,5,6,7-tetrahydrobenzo[c][1,2,5]oxadiazolyl, and 6,7-dihydrobenzo[c][1,2,5]oxadiazol-4(5H)-onyl. In certain embodiments, the fused bicyclic heteroaryl is a 5 or 6 membered monocyclic heteroaryl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused cycloalkyl, cycloalkenyl, and heterocyclyl groups are optionally substituted with one or two groups which are independently oxo or thia. The multicyclic heteroaryl group is a monocyclic heteroaryl ring (base ring) fused to either (i) one ring system selected from the group consisting of a bicyclic aryl, a bicyclic heteroaryl, a bicyclic heterocyclyl, a bicyclic cycloalkenyl, and a bicyclic cycloalkyl; or (ii) two ring systems selected from the group consisting of a phenyl, a bicyclic aryl, a monocyclic or bicyclic heteroaryl, a monocyclic or bicyclic heterocyclyl, a monocyclic or bicyclic cycloalkenyl, and a monocyclic or bicyclic cycloalkyl. The multicyclic heteroaryl group is connected to the parent molecular moiety through any carbon atom or nitrogen atom contained within the base ring. In certain embodiments, multicyclic heteroaryl groups are a monocyclic heteroaryl ring (base ring) fused to either (i) one ring system selected from the group consisting of a bicyclic aryl, a bicyclic heteroaryl, a bicyclic heterocyclyl, a bicyclic cycloalkenyl, and a bicyclic cycloalkyl; or (ii) two ring systems selected from the group consisting of a phenyl, a monocyclic heteroaryl, a monocyclic heterocyclyl, a monocyclic cycloalkenyl, and a monocyclic cycloalkyl. Examples of multicyclic heteroaryls include, but are not limited to 5H-[1,2,4]triazino[5,6-b]indol-5-yl, 2,3,4,9-tetrahydro-1H-carbazol-9-yl, 9H-pyrido[3,4-b]indol-9-yl, 9H-carbazol-9-yl, and acridin-9-yl.

As used herein, "heteroarylene" refers to a linking heteroaryl group.

As used herein, the term "halo" or "halogen" includes fluoro, chloro, bromo, and iodo.

As used herein, "alkoxy" refers to an —O-alkyl group. Example alkoxy groups include methoxy, ethoxy, propoxy (e.g., n-propoxy and isopropoxy), t-butoxy, and the like.

As used herein, "aryloxy" refers to an —O-aryl group. Example aryloxy groups include phenyl-O—, substituted phenyl-O—, and the like.

As used herein, "haloalkyl" refers to an alkyl group having one or more halogen substituents. Example haloalkyl groups include $CF_3$, $C_2F_5$, $CHF_2$, $CCl_3$, $CHCl_2$, $C_2Cl_5$, and the like.

As used herein, "haloalkenyl" refers to an alkenyl group having one or more halogen substituents.

As used herein, "haloalkynyl" refers to an alkynyl group having one or more halogen substituents.

As used herein, "haloalkoxy" refers to an —O-(haloalkyl) group.

As used herein, "heteroalkyl" refers to an alkyl group having at least one heteroatom such as sulfur, oxygen, or nitrogen.

As used herein, "heteroalkylene" refers to a linking heteroalkyl group.

As used herein, "amino" refers to $NH_2$.

As used herein, "alkylamino" refers to an amino group substituted by an alkyl group.

As used herein, "dialkylamino" refers to an amino group substituted by two alkyl groups.

As used herein, "ether" refers to a group comprising an oxygen atom connected to two alkyl or aryl groups. As used herein, a "vinyl ether" refers to an ether comprising a carbon-carbon double bond bound to the oxygen atom.

As used herein, an "initiator" is a compound capable of initiating polymerization or other bond formation. In certain embodiments, the initiator can form a radical cation. In some embodiments, the initiator includes a vinyl ether moiety. In some embodiments, the initiator forms a radical cation in the presence of a photoredox mediator and light.

As used herein, an "organic initiator" refers to a polymerization initiator having one or more carbon atoms covalently linked to hydrogen, oxygen, and/or nitrogen. Certain carbon-containing compounds are not considered organic: carbides, carbonates and cyanides. As used herein, the organic initiator does not contain metals (i.e., metal-free).

As used herein, an "organic unsaturated initiator" refers to a polymerization initiator having carbon-carbon double bonds or carbon-carbon triple bonds.

As used herein, a "strained cyclic unsaturated monomer" refers to a cyclic or heterocyclic monomer having a ring strain, where the angles in a molecule are compressed or expanded compared to their optimal value. As an example, in bicyclic molecules, the amount of strain energy can be the sum of the strain energy in each individual ring.

As used herein, an "electron donating substituent" refers to a substituent that adds electron density to an adjacent pi-system, making the pi-system more nucleophilic. In some embodiments, an electron donating substituent has lone pair electrons on the atom adjacent to pi-system. In some embodiments, electron donating substituents have pi-electrons, which can donate electron density to the adjacent pi-system via hyperconjugation. Examples of electron donating substituents include O—, $NR_2$, $NH_2$, OH, OR, NHC(O)R, OC(O)R, aryl, and vinyl substituents.

As used herein, a "4-membered carbocyclic intermediate" refers to a polymerization intermediate molecule having a cyclobutane moiety.

As used herein, "electronic conjugation" refers to the overlap of one p-orbital with another across an intervening sigma bond. In transition metals, d-orbitals can be involved. A conjugated system has a region of overlapping p-orbitals, bridging the interjacent single bonds. Delocalization of pi electrons across all the adjacent aligned p-orbitals can occur, where the pi electrons do not belong to a single bond or atom, but to a group of atoms.

As used herein, "unsaturated bond" refers to a carbon-carbon double bond or a carbon-carbon triple bond.

As used herein, a "sacrificial co-initiator" refers to a molecule that oxidizes an organic polymerization initiator. The co-initiator is reduced in the process and is rendered inactive.

As used herein, a "non-sacrificial co-initiator" refers to a mediator.

As used herein, a "mediator" refers to a catalyst that accelerates a chemical reaction via an electron transfer. The mediator can participate multiple times in the electron transfer reaction (oxidation and reduction).

As used herein, a "photoredox mediator" or "photoredox catalyst" is a catalyst that harnesses the energy of light (e.g., visible light) to accelerate a chemical reaction via an electron transfer. In certain embodiments of the present application, photoredox mediators are organic molecules, such as pyrylium and acridinium salts.

As used herein, a "monomer" is a substance, each of the molecules of which can, on polymerization, contribute one or more constitutional units in the structure of a macromolecule or polymer.

As used herein, the term "copolymer" refers to a polymer that is the result of polymerization of two or more different monomers. The number and the nature of each constitutional unit can be separately controlled in a copolymer. The constitutional units can be disposed in a purely random, an alternating random, a regular alternating, a regular block, or a random block configuration unless expressly stated to be otherwise. A purely random configuration can, for example, be: x-x-y-z-x-y-z-y-z-y-z-zz . . . or y-z-x-y-z-y-z-x-x . . . . An alternating random configuration can be: x-y-x-z-y-x-yz-y-x-z . . . , and a regular alternating configuration can be: x-y-z-x-y-z-x-y-z . . . . A regular block configuration has the following general configuration: . . . x-x-x-y-y-y-zz-z-x-x-x . . . , while a random block configuration has the general configuration: . . . x-x-x-z-z-x-x-y-y-y-y-z-z-z-x-x-z-z-z- . . . .

As used herein, the term "constitutional unit" of a polymer refers to an atom or group of atoms in a polymer, comprising a part of the chain together with its pendant atoms or groups of atoms, if any. The constitutional unit can refer to a repeat unit. The constitutional unit can also refer to an end group on a polymer chain. For example, the constitutional unit of polyethylene glycol can be —CH$_2$CH$_2$O— corresponding to a repeat unit, or —CH$_2$CH$_2$OH corresponding to an end group.

As used herein, the term "repeat unit" corresponds to the smallest constitutional unit, the repetition of which constitutes a regular macromolecule (or oligomer molecule or block).

As used herein, the term "end group" refers to a constitutional unit with only one attachment to a polymer chain, located at the end of a polymer. For example, the end group can be derived from a monomer unit at the end of the polymer, once the monomer unit has been polymerized. As another example, the end group can be a part of a chain transfer agent or initiating agent that was used to synthesize the polymer.

As used herein, the term "terminus" of a polymer refers to a constitutional unit of the polymer that is positioned at the end of a polymer backbone.

As used herein, "living polymerization" refers to a method of synthesizing polymers using the well-known concept of addition polymerization, that is, polymerization wherein monomers are added one-by-one to an active site on the growing polymer chain but one wherein the active sites for continuing addition of another monomer are never fully eliminated other than on purpose. That is, the polymer chain is virtually always capable of further extension by the addition of more monomer to the reaction mixture unless the polymer has been capped, which may be reversible so as permit polymerization to continue or quenched, which is usually permanent. While numerous genera of living polymerizations are known, currently the predominant types are anionic, cationic, and radical living polymerizations.

As used herein, a "crosslink" or "cross-linking moiety", which can be used interchangeably, is a constitutional unit connecting two parts of a macromolecule or polymer.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Polymerization Methods

Referring to Scheme 3, the ROMP process of the present disclosure is initiated by one-electron oxidation of an organic initiator, which can be, for example, a vinyl ether initiator A, to produce an activated radical cation B. Reaction of the activated radical cation B with a strained cyclic unsaturated monomer forms a [2+2] complex, such as C. Rather than undergoing reductive quenching to generate cyclobutanes, rapid ring-opening to alleviate ring-strain occurs, which completes the ROMP initiation event to arrive at D. Continued propagation with additional strained cyclic unsaturated monomers ultimately yields ROMP polymers, which can bear a reactive radical cation chain end E. Reductive quenching then provides neutral polymer F. The ROMP process does not rely on metal-based catalysts. In some embodiments, the ROMP process is free of metals.

Scheme 3. Metal-free ROMP mechanism

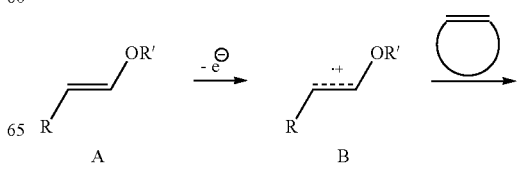

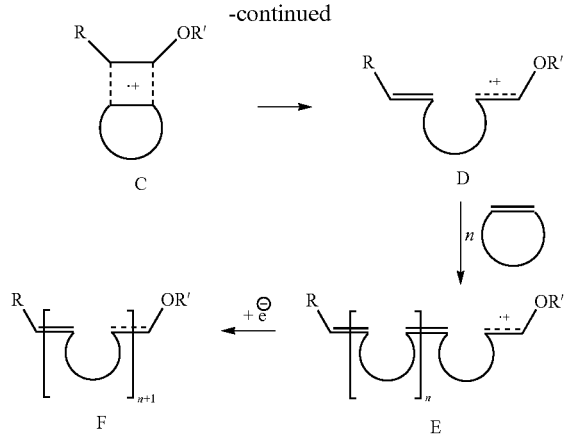

Accordingly, in some embodiments, the present disclosure is directed to methods of making a polymer, including exposing a reaction mixture including a strained cyclic unsaturated monomer and an organic initiator to a stimulus to provide an activated organic initiator, whereby the activated organic initiator is effective to polymerize the strained cyclic unsaturated monomer (e.g., via a 4-membered carbocyclic intermediate) to provide a polymer having constitutional units derived from the strained cyclic unsaturated monomer. The 4-membered carbocyclic intermediate can be formed by a [2+2] cycloaddition of the activated organic initiator and the strained cyclic unsaturated monomer.

In another aspect, this disclosure features a method of making a polymer including exposing a reaction mixture including a strained cyclic unsaturated monomer, an organic unsaturated initiator, and a co-initiator, to a stimulus to provide an activated co-initiator which activates the organic unsaturated initiator, whereby the activated organic unsaturated initiator is effective to polymerize the strained cyclic unsaturated monomer, to provide a polymer having constitutional units derived from the strained cyclic unsaturated monomer.

In some embodiments, the reaction mixture can include one or more monomers including a cycloalkene moiety; an initiator including a vinyl ether moiety; and optionally a photoredox mediator capable of facilitating electron transfer between the initiator and the monomer; and exposing the mixture to a stimulus (e.g., light, heat, an electric voltage), to polymerize the monomer.

In some embodiments, the present disclosure provides a method of making a cross-linked polymer including providing a reaction mixture that includes one or more monomers containing a cycloalkene moiety; an initiator comprising a vinyl ether moiety; and optionally a photoredox mediator capable of facilitating electron transfer between the initiator and the monomer; exposing the mixture to light to polymerize the monomer to provide a polymer; and introducing a crosslinking moiety to the mixture to crosslink the polymer. In some embodiments, rather than crosslinking the polymer post-polymerization, the one or more monomers containing a cycloalkene moiety can be a crosslinker (e.g., a multifunctional monomer), such that a crosslinked polymer is produced during polymerization.

Reaction Mixture Components

As discussed above, the reaction mixture that is exposed to a stimulus to provide a polymer or a crosslinked polymer can include a variety of components, such as organic initiators, co-initiators, mediators, monomers (and co-monomers), and/or crosslinkers. Each of these will be expanded in detail below.

Organic Initiators

In some embodiments, the organic initiator is an organic unsaturated initiator. The organic unsaturated initiator can include, for example, one or more electron-donating substituents in electronic conjugation with an unsaturated bond.

In some embodiments, the electron-donating substituent is $C_{1-20}$ alkoxy, aryloxy, $C_{1-20}$ alkyl-NH—, aryl-NH—, $C_{1-20}$ alkyl-S—, and/or aryl-S—.

In some embodiments, the electron-donating substituent is $C_{1-10}$ alkoxyl, aryloxy, $C_{1-10}$ alkyl-NH—, aryl-NH—, $C_{1-10}$ alkyl-S—, and/or aryl-S—.

In some embodiments, the electron-donating substituent is $C_{1-6}$ alkoxyl, aryloxy, $C_{1-6}$ alkyl-NH—, aryl-NH—, $C_{1-6}$ alkyl-S—, and/or aryl-S—.

In some embodiments, the organic unsaturated initiator is a compound of Formula (I)

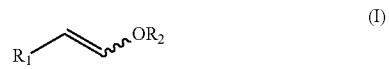

(I)

wherein $R_1$ is selected from hydrogen, $C_1$-$C_{20}$ alkyl, $C_2$-$C_{20}$ alkenyl, cycloalkyl, aryl, and heteroaryl, wherein said $C_1$-$C_{20}$ alkyl is optionally substituted with aryl; and $R_2$ is selected from $C_1$-$C_{20}$ alkyl, cycloalkyl, aryl, and heteroaryl.

In some embodiments, $R_1$ is selected from hydrogen, $C_1$-$C_{20}$ alkyl, $C_2$-$C_{20}$ alkenyl, aryl, and heteroaryl; and $R_2$ is selected from $C_1$-$C_{20}$ alkyl, cycloalkyl, aryl, and heteroaryl.

In some embodiments, $R_1$ is selected from hydrogen, $C_1$-$C_{20}$ alkyl, $C_2$-$C_{20}$ alkenyl, phenyl, and heteroaryl; and $R_2$ is selected from $C_1$-$C_{20}$ alkyl, cycloalkyl, aryl, and heteroaryl.

In some embodiments, $R_1$ is selected from hydrogen, $C_1$-$C_{10}$ alkyl, $C_2$-$C_{10}$ alkenyl, $C_3$-$C_{10}$ cycloalkyl, aryl, and heteroaryl, wherein said $C_1$-$C_{10}$ alkyl is optionally substituted with aryl.

In some embodiments, $R_1$ is selected from hydrogen, $C_1$-$C_6$ alkyl, $C_2$-$C_6$ alkenyl, $C_3$-$C_6$ cycloalkyl, aryl, and heteroaryl, wherein said $C_1$-$C_6$ alkyl is optionally substituted with aryl.

In some embodiments, $R_1$ is selected from hydrogen, $C_1$-$C_6$ alkyl, $C_3$-$C_6$ cycloalkyl, aryl, and heteroaryl, wherein said $C_1$-$C_6$ alkyl is optionally substituted with aryl.

In some embodiments, $R_1$ is selected from hydrogen, $C_1$-$C_6$ alkyl, $C_3$-$C_6$ cycloalkyl, and aryl, wherein said $C_1$-$C_6$ alkyl is optionally substituted with aryl.

In some embodiments, $R_1$ is selected from hydrogen, $C_1$-$C_6$ alkyl, $C_3$-$C_6$ cycloalkyl, and phenyl, wherein said $C_1$-$C_6$ alkyl is optionally substituted with aryl.

In some embodiments, $R_2$ is selected from $C_1$-$C_{20}$ alkyl, $C_3$-$C_{10}$ cycloalkyl, aryl, and heteroaryl.

In some embodiments, $R_2$ is selected from $C_1$-$C_{20}$ alkyl, $C_3$-$C_{10}$ cycloalkyl, and aryl.

In some embodiments, $R_2$ is selected from $C_1$-$C_{10}$ alkyl, $C_3$-$C_{10}$ cycloalkyl, and aryl.

In some embodiments, $R_2$ is selected from $C_{1-6}$ alkyl, $C_3$-$C_6$ cycloalkyl, and aryl.

In some embodiments, $R_2$ is selected from $C_{1-6}$ alkyl and $C_{3-6}$ cycloalkyl.

In some embodiments, $R_2$ is $C_{1-6}$ alkyl.

It is understood that any of the above embodiments for the definitions of $R_1$ and $R_2$ can be combined to provide a compound of Formula (I).

For example, in some embodiments, $R_1$ is selected from hydrogen, $C_1$-$C_6$ alkyl, $C_2$-$C_6$ alkenyl, $C_3$-$C_6$ cycloalkyl, aryl, and heteroaryl, wherein said $C_1$-$C_6$ alkyl is optionally substituted with aryl; and $R_2$ is selected from $C_1$-$C_{10}$ alkyl, $C_3$-$C_{10}$ cycloalkyl, and aryl.

In some embodiments, $R_1$ is selected from $C_1$-$C_6$ alkyl, $C_3$-$C_6$ cycloalkyl, and aryl, wherein said $C_1$-$C_6$ alkyl is optionally substituted with aryl; and $R_2$ is selected from $C_1$-$C_{10}$ alkyl, $C_3$-$C_{10}$ cycloalkyl, and aryl.

In some embodiments, $R_1$ is selected from $C_1$-$C_6$ alkyl, $C_3$-$C_6$ cycloalkyl, and aryl, wherein said $C_1$-$C_6$ alkyl is optionally substituted with aryl; and $R_2$ is selected from $C_1$-$C_{10}$ alkyl and $C_3$-$C_{10}$ cycloalkyl.

In some embodiments, $R_1$ is selected from $C_1$-$C_6$ alkyl, $C_3$-$C_6$ cycloalkyl, and aryl, wherein said $C_1$-$C_6$ alkyl is optionally substituted with aryl; and $R_2$ is $C_1$-$C_{10}$ alkyl.

In some embodiments, the organic unsaturated initiator is selected from

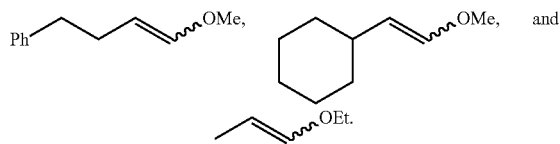

The organic initiator can be activated by oxidation. For example, the activated organic initiator (i.e., oxidized organic initiator) can include a cationic radical.

In some embodiments, instead or in addition to an organic unsaturated initiator, the organic initiator includes an organic photoinitiator. For example, the organic photoinitiator can be selected from

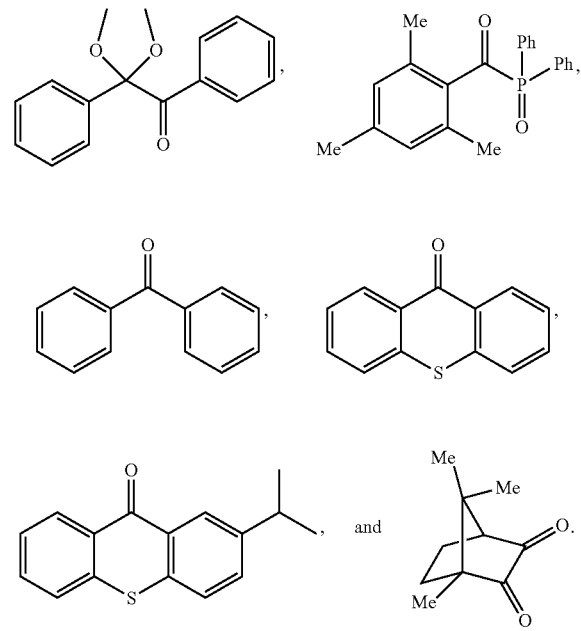

The organic photoinitiator is capable of bond formation when exposed to light.

The organic initiator to monomer (and co-monomer) ratio in a reaction mixture can range from 1:20 (e.g., from 1:50, from 1:100, from 1:200, from 1:500, from 1:1000, from 1:2000, from 1:3000, or from 1:4000) to 1:5000 (e.g., to 1:4000, to 1:3000, to 1:2000, to 1:1000, to 1:500, to 1:200, to 1:100, or to 1:50). For example, the organic initiator to monomer (and co-monomer) ratio can range from 1:20 to 1:1000, from 1:100 to 1:1000, from 1:200 to 1:2000, from 1:1000 to 1:5000, or from 1:1000 to 1:3000. In some embodiments, the organic initiator to monomer (and co-monomer) ratio is 1:20. In certain embodiments, the organic initiator to monomer ratio is 1:5000. In certain embodiments, the organic initiator to monomer (and co-monomer) ratio is 1:100, 1:200, 1:500, 1:1000, 1:2000, 1:3000, or 1:4000.

Co-Initiators (Mediators)

In some embodiments, as discussed above, the present disclosure features a method of making a polymer including exposing a reaction mixture comprising a strained cyclic unsaturated monomer, an organic unsaturated initiator, and a co-initiator, to a stimulus to provide an activated co-initiator which activates the organic unsaturated initiator to provide a polymer having constitutional units derived from the strained cyclic unsaturated monomer. The co-initiator can be sacrificial or non-sacrificial. The sacrificial co-initiator refers to a molecule that oxidizes an organic polymerization initiator, and is reduced in the process and is rendered inactive. The non-sacrificial co-initiator can also be a mediator.

In some embodiments, a non-sacrificial co-initiator (i.e., a mediator, a photoredox mediator) is a pyrylium salt, an acridinium salt, a thiopyrylium salt, a 2,3-dichloro-5,6-dicyano-1,4-benzoquinone, and/or a persulfate salt.

In some embodiments, the non-sacrificial co-initiator can be a compound of Formula (II), (III), or (IV):

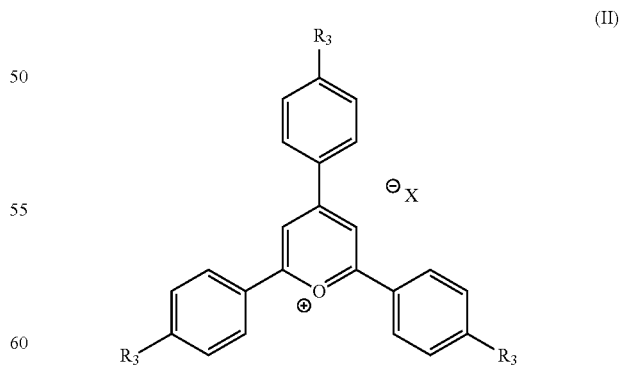

wherein:

$R_3$ is each independently selected from H, $C_{1-6}$ alkyl, $C_{1-6}$ alkoxy, and aryl; and $X^-$ is a counterion.

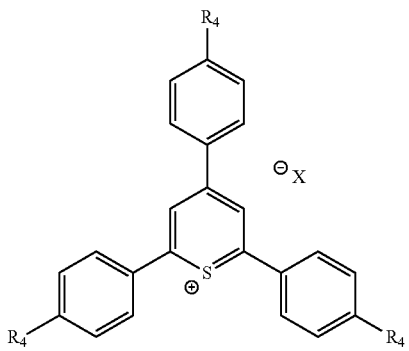

(III)

wherein:

$R_4$ is each independently selected from H, $C_{1-6}$ alkyl, $C_{1-6}$ alkoxy, and aryl; and $X^-$ is a counterion.

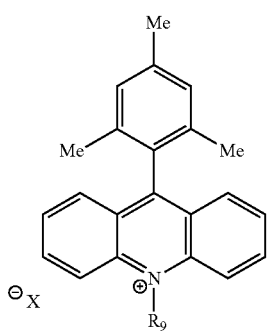

(IV)

wherein:

$R_9$ is $C_{1-10}$ alkyl; and $X^-$ is a counterion.

In some embodiments, $R_3$ is each independently selected from H, $C_{1-3}$ alkyl, $C_{1-3}$ alkoxy, and aryl.

In some embodiments, $R_3$ is each independently selected from H, $CH_3$, $OCH_3$, and phenyl.

In some embodiments, $R_4$ is each independently selected from H, $C_{1-3}$ alkyl, $C_{1-3}$ alkoxy, and aryl.

In some embodiments, $R_4$ is each independently selected from H, $CH_3$, $OCH_3$, and phenyl.

In some embodiments, $R_9$ is $C_{1-6}$ alkyl.

In some embodiments, $R_9$ is methyl.

In some embodiments, $X^-$ is $BF_4^-$ or $ClO_4^-$.

In some embodiments, $X^-$ is $BF_4^-$.

In some embodiments, $R_3$ is each independently selected from H, $CH_3$, $OCH_3$, and phenyl; and $X^-$ is $BF_4^-$.

In some embodiments, $R_4$ is each independently selected from H, $CH_3$, $OCH_3$, and phenyl; and $X^-$ is $BF_4^-$.

In some embodiments, the compound of Formula (IV) is

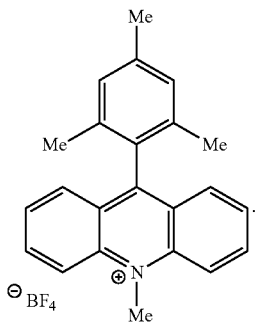

In certain embodiments, the non-sacrificial co-initiator (i.e., the mediator, the photoredox mediator) is a compound of Formula (V)

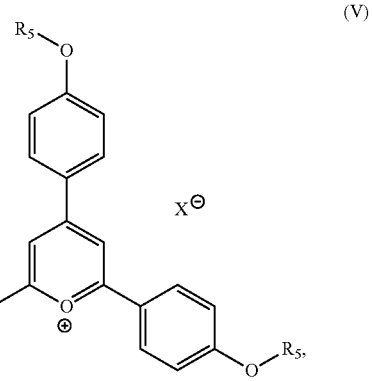

(V)

wherein $R_5$ is each selected from alkyl, alkenyl, alkynyl, and aryl, and $X^-$ is a counterion.

In some embodiments, $R_5$ is each selected from alkyl, alkenyl, and alkynyl.

In some embodiments, $R_5$ is each selected from branched or straight-chain alkyl groups having greater than six carbons.

In some embodiments, $R_5$ is each selected from $C_{1-10}$ alkyl, $C_{2-10}$ alkenyl, and $C_{2-10}$ alkynyl.

In some embodiments, $R_5$ is each selected from $C_{1-10}$ alkyl and $C_{2-10}$ alkenyl.

In some embodiments, $R_5$ is each selected from $C_{1-10}$ alkyl.

In some embodiments, $R_5$ is each independently selected from $C_{1-6}$ alkyl.

In some embodiments, $R_5$ is each independently selected from $C_{1-6}$ alkyl and phenyl.

In some embodiments, $X^-$ is $BF_4^-$ and $ClO_4^-$.

In some embodiments, $R_5$ is each selected from alkyl, alkenyl, and alkynyl.

In some embodiments, $R_5$ is each selected from branched or straight-chain alkyl groups having greater than six carbons; and $X^-$ is $BF_4^-$ and $ClO_4^-$.

In some embodiments, $R_5$ is each selected from $C_{1-10}$ alkyl, $C_{2-10}$ alkenyl, and $C_{2-10}$ alkynyl; and $X^-$ is $BF_4^-$ and $ClO_4^-$.

In some embodiments, $R_5$ is each selected from $C_{1-10}$ alkyl and $C_{2-10}$ alkenyl; and $X^-$ is $BF_4^-$ and $ClO_4^-$.

In some embodiments, $R_5$ is each selected from $C_{1-10}$ alkyl; and $X^-$ is $BF_4^-$ and $ClO_4^-$.

In some embodiments, $R_5$ is each independently selected from $C_{1-6}$ alkyl; and $X^-$ is $BF_4^-$ and $ClO_4^-$.

In some embodiments, $R_5$ is each independently selected from $C_{1-6}$ alkyl and phenyl; and $X^-$ is $BF_4^-$ and $ClO_4^-$.

In some embodiments, the non-sacrificial co-initiator is a compound of Formula (VI)

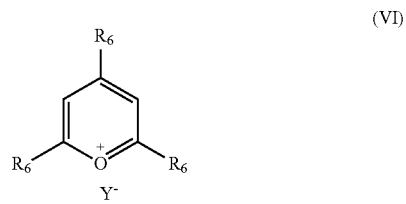

wherein:

$R_6$ is each independently selected from $C_{1-20}$ alkyl, $C_{2-20}$ alkenyl, phenyl, aryl, and heteroaryl groups, and $Y^-$ is a counterion.

In some embodiments, $R_6$ is each independently selected from aryl or heteroaryl optionally substituted with 1, 2, or 3 substituents each independently selected from alkyl, alkoxy, —O-alkenyl, and —O-alkynyl.

In some embodiments, $R_6$ is each independently aryl or heteroaryl optionally substituted with 1, 2, or 3 substituents each independently selected from $C_{1-6}$ alkyl, $C_{1-6}$ alkoxy, —O—$C_{2-6}$ alkenyl, and —O—$C_{2-6}$ alkynyl.

In some embodiments, $R_6$ is aryl optionally substituted with 1, 2, or 3 substituents each independently selected from $C_{1-6}$ alkyl, $C_{1-6}$ alkoxy, —O—$C_{2-6}$ alkenyl, and —O—$C_{2-6}$ alkynyl groups.

In some embodiments, $R_6$ is aryl optionally substituted with 1, 2, or 3 substituents each independently selected from $C_{1-6}$ alkyl, $C_{1-6}$ alkoxy, and —O—$C_{2-6}$ alkenyl.

In some embodiments, $R_6$ is aryl optionally substituted with 1, 2, or 3 substituents each independently selected from $C_{1-6}$ alkyl and $C_{1-6}$ alkoxy.

In some embodiments, $R_6$ is aryl optionally substituted with 1, 2, or 3 substituents each independently selected from $C_{1-3}$ alkyl and $C_{1-3}$ alkoxy.

In some embodiments, Y is an anion selected from $BF_4^-$ and $ClO_4^-$.

The co-initiator to monomer (and co-monomer) ratio in a reaction mixture can range from 1:100 (e.g., from 1:500, from 1:1000, from 1:5000, from 1:10,000, from 1:50,000, from 1:100,000, from 1:500,000, or from 1:750,000) to 1:1,000,000 (e.g., to 1:750,000, to 1:500,000, to 1:100,000, to 1:50,000, to 1:10,000, to 1:5,000, to 1:1000, or to 1:500). For example, the organic initiator to monomer (and co-monomer) ratio can range from 1:100 to 1:10,000, from 1:100 to 1:100,000, from 1:100 to 1:1,000,000, from 1:1000 to 1:500,000, from 1:10,000 to 1:100,000, or from 1:10,000 to 1:500,000. In some embodiments, the co-initiator to monomer (and co-monomer) ratio is 1:100. In certain embodiments, the organic initiator to monomer ratio is 1:1,000,000. In certain embodiments, the organic initiator to monomer (and co-monomer) ratio is 1:100, 1:500, 1:1000, 1:5000, 1:10,000, 1:50,000, 1:100,000, 1:500,000, or 1:750,000.

In some embodiments, instead of a non-sacrificial co-initiator, the reaction mixture includes a sacrificial co-initiator, which can be an oxidizing agent. For example, the sacrificial co-initiator can be $Na_2SO_5$, $KHSO_5$, $Na_2S_2O_8$, and/or $(NH_4)_2S_2O_8$. The sacrificial co-initiator can oxidize the initiator so that the initiator can react with a monomer.

In some embodiments, the sacrificial or non-sacrificial co-initiator is soluble in an organic solvent and/or miscible with the monomers of the present disclosure. When the sacrificial or non-sacrificial co-initiator is soluble or miscible in monomers, and the mixture of sacrificial or non-sacrificial co-initiator and monomers is liquid at either ambient or elevated temperatures, then the polymerization reaction can occur in the absence of a solvent. When the polymerization reaction is solvent-free, the overall efficiency of material production can be increased (by eliminating solvent costs, and solvent removal procedures after the polymerization), and the polymerization reaction can allow for materials such as cross-linked photo-cured resins to be produced without void spaces or impurities that can be caused by solvent entrapment.

Monomers (and Co-Monomers)

As discussed above, the reaction mixture includes a strained cyclic unsaturated monomer. In some embodiments, the strained cyclic unsaturated monomer has a ring strain of at least 20 kcal/mol. In some embodiments, the strained cyclic unsaturated monomer is a strained cycloalkene. The strained cycloalkene can be, for example, norbornene, cyclobutene, cyclooctene, cyclodecene, cyclododecatriene, and/or derivatives thereof.

In some embodiments, the strained cycloalkene is

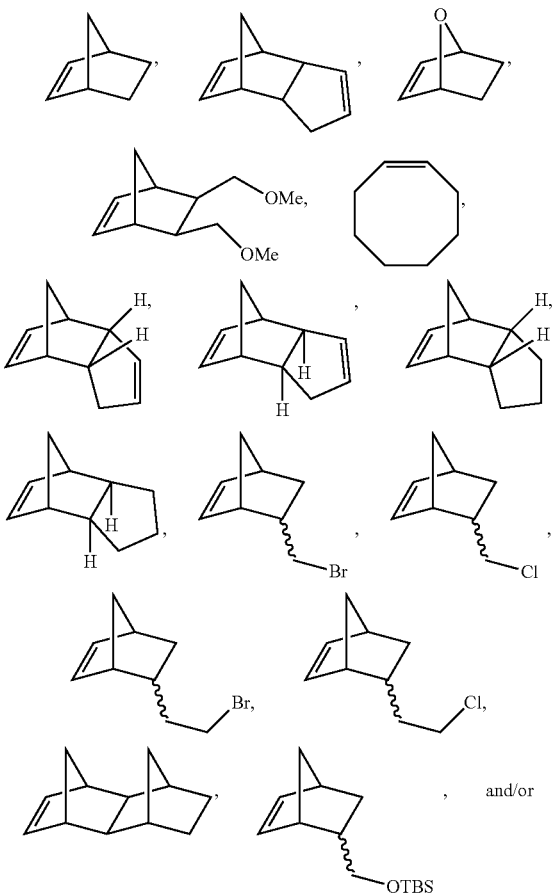

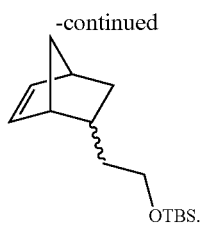

In some embodiments, the strained cycloalkene is

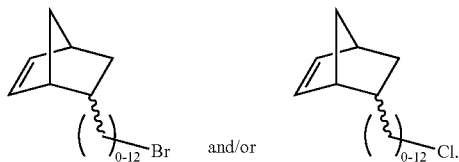

In some embodiments, the strained cycloalkene is branched. In some embodiments, the strained cycloalkene includes a bicyclic [2.2.1] heptane moiety.

In some embodiments, polymers with pendant alcohol and silyl groups can be made using the methods of the present disclosure, by providing a reaction mixture having a monomer including a cycloalkene moiety that includes a silyl ether.

In certain embodiments, the monomer that includes a cycloalkene moiety having a silyl ether has a Formula (VII)

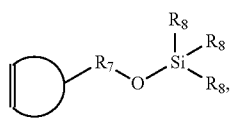

(VII)

wherein $R_7$ is selected from alkyl, alkenyl, alkynyl, and poly(ethylene oxide), and $R_8$ is independently selected from hydrogen, alkyl, alkenyl, and alkynyl. The silyl ether-containing monomer can be used as the sole monomer in a reaction mixture, or in combination with other monomers, in any ratio.

In some embodiments, $R_7$ is selected from $C_{1-6}$ alkyl, $C_{2-6}$ alkenyl, $C_{2-6}$ alkynyl, and polyethylene oxide.

In some embodiments, $R_7$ is selected from $C_{1-6}$ alkyl, $C_{2-6}$ alkenyl, and polyethylene oxide.

In some embodiments, $R_7$ is selected from $C_{1-6}$ alkyl and polyethylene oxide.

In some embodiments, $R_8$ is independently selected from hydrogen, $C_{1-6}$ alkyl, $C_{2-6}$ alkenyl, and $C_{2-6}$ alkynyl, provided that at least one $R_8$ is not hydrogen.

In some embodiments, $R_8$ is independently selected from hydrogen, $C_{1-6}$ alkyl, and $C_{2-6}$ alkenyl, provided that at least one $R_8$ is not hydrogen.

In some embodiments, $R_8$ is independently selected from hydrogen and $C_{1-6}$ alkyl provided that at least one $R_8$ is not hydrogen.

In certain embodiments, the silyl monomer has the formula

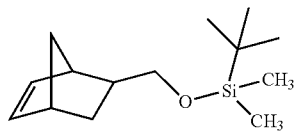

The silyl ether-containing monomers can be readily polymerized either as the sole monomers of the reaction or as part of a mixture of monomers using the methods of the present disclosure, and can provide alkyl-, dialkyl-, or trialkylsiloxy oligomers or polymers. Furthermore, the silyl ether group can be readily removed using standard protocols such that the silyl ethers in the final polymer can be partially or entirely converted into a hydroxyl functional group (to produce a polyalcohol). An illustrative example for polymerization of a silyl ether-containing monomer is provided in Example 4, below.

Crosslinkers

The methods of the present disclosure can provide a crosslinked polymer that is based upon hydrocarbons and/or that is substantially free of metals.

For example, after polymerization, the methods can further include crosslinking the polymer. The crosslinkers have two or more reactive groups, such as thiol, hydroxy, amino, or carboxylic acid groups. In some embodiments, the crosslinkers further include a spacer in between the two or more reactive groups, such as an arylene, an alkylene, a diarylsulfanyl, or a polyethylene glycol spacer.

In some embodiments, crosslinking the polymer includes reacting the polymer with a crosslinker selected from:

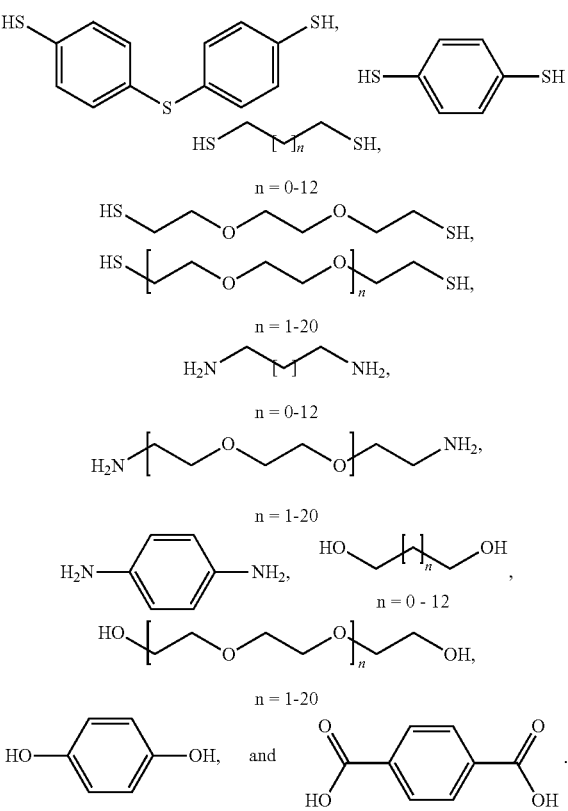

In some embodiments, rather than crosslinking a polymer in a post-polymerization reaction, a crosslinked polymer can be made during polymerization, using multifunctional monomers. For example, a reaction based upon hydrocarbons and/or that substantially excludes metals can have a reaction mixture that further includes monomers having at least two cycloalkene moieties, which results in a direct, single step crosslinking to produce a crosslinked polymer. The crosslinked polymer can have high toughness and durability, and a one-step synthesis of crosslinked polymer can be amenable to photo-curing processes and vat photopolymerizations. In certain embodiments, the reaction mixtures of the present disclosure include a strained cyclic unsaturated monomer having a single unsaturated moiety and a multifunctional monomer having two or more cycloalkene moieties. The ratio between a strained cyclic unsaturated monomer having a single unsaturated moiety and a multifunctional monomer can be from about 10,000:1 to about 10:1 (e.g., from about 10,000:1 to about 10:1, from about 10,000:1 to about 100:1, from about 10,000:1 to about 1,000:1, from about 1,000:1 to about 10:1, from about 1,000:1 to about 100:1, or from about 100:1 to about 10:1).

In some embodiments, the multifunctional monomers include at least two cycloalkene moieties coupled through a linker. In certain embodiments, such a monomer has the formula (VIII):

(VIII)

wherein L is a linker selected from alkylene, alkenylene, alkynylene, polysiloxane, and poly(ethylene oxide).

In some embodiments, L is a linker selected from $C_{1-20}$ alkylene, $C_{2-20}$ alkenylene, $C_{2-20}$ alkynylene, polysiloxane, and poly(ethylene oxide).

In some embodiments, the multifunctional monomer is

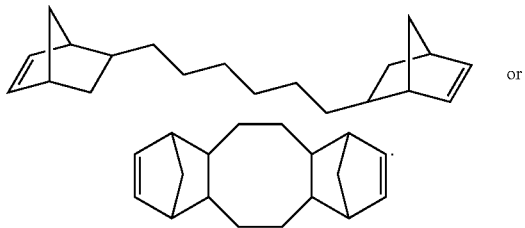

or

Stimulus

In some embodiments, the stimulus used to initiate the ROMP reaction is light, heat, and/or an electric potential. The light can be, for example, ultraviolet light having a wavelength of about 250-350 nm and/or visible light having a wavelength of about 350-750 nm. The heat can be, for example, a temperature of up to about 150° C. (e.g., from about 25° C. to about 150° C., from about 40° C. to about 150° C., from about 60° C. to about 150° C., or from about 80° C. to about 150° C.). The electric potential can be, for example, from 0 to +2.5 V (e.g., 0 to +2 V, 0.5 to +2.5 V) vs. saturated calomel electrode (SCE).

In certain embodiments, a source of the light is a blue LED. In certain other embodiments, the light source is a white light. The white light can include fluorescent bulbs and digital light processing (DLP) projectors, including commercially available DLP projectors. DLP projectors can enable polymerization processes in which the DLP projector projects specific images that dictate the shape of the polymerized material. Methods using light sources can further include layer-by-layer protocols or additive manufacturing (three-dimensional printing) by vat polymerization. The additive manufacturing process can include polymerizing a reaction mixture of the present disclosure by exposing the reaction mixture to light in a layer-by-layer manner to provide a three-dimensional object.

For example, in some embodiments, the additive manufacturing process includes providing a mixture including a cycloalkene moiety-containing monomer, an initiator having a vinyl ether moiety, and a photoredox mediator capable of facilitating electron transfer between the initiator and the monomer; exposing a first portion of the mixture to light to polymerize a first portion of the mixture; and exposing a second portion of the mixture adjacent to the first polymerized portion of the mixture to light to polymerize a second portion of the mixture. The polymerization is continued in a layer-by-layer manner to provide a three-dimensional object.

Polymerization Conditions

In certain embodiments, the methods of the present disclosure are conducted under oxygen-free and/or water-free environments. The oxygen-free and/or water-free environment can be accomplished with an inert-atmosphere drybox, filled with, for example, nitrogen or argon gas, and/or with anhydrous solvent and other anhydrous reagents.

In certain other embodiments, the methods of the present disclosure are conducted in ambient conditions, or other oxygen-containing and/or water-containing conditions. In some embodiments, the reaction mixture can contain about 1% or less of water. For example, when reagent grade solvent is used without any protocols to remove water, and the polymerization is conducted in an open container in ambient atmosphere, the polymerization can achieve conversion of monomer and final polymer molecular weight similar to those obtained under air-free conditions. The ability to effect polymerization under ambient conditions is important as it greatly simplifies the technical aspects of the polymerization, gives important insights into the reactivity of the reagents, and enables a broader scope of applications. Specific applications may include systems for reaction injection molding, additive manufacturing (3D printing), or other applications in which on-demand curing is desirable.

Polymer Properties

The polymers made by the methods of the present disclosure can have an alkenyl substituted with a $C_1$-$C_{20}$ alkoxy moiety at a polymer terminus. The polymers can be colorless, white, or beige in coloration. In some embodiments, the polymer is metal-free.

Compared to metal-catalyzed ROMP polymers, the polymers made by the methods of the present disclosure have increased stability (i.e., are less susceptible to degradation), are not as darkly colored, and can be functionalized with a variety of functional groups, such as ester and alcohol moieties.

Articles

The polymers made by the methods of the present disclosure can be used to make a variety of articles. For example, the polymers can be incorporated into dental implants, vehicle components (vehicle body parts), corrosion-resistant casings, protective eye equipment, ballistic impact resistant materials (e.g., ballistic panels), prosthetics, orthotics, athletic equipment, electronic devices, and/or optics devices.

Cross Metathesis and Ring-Closing Metathesis

While the methods of the present disclosure are useful in ROMP reactions, they can also be used for performing other reactions. Scheme 4 provides generalized depictions of the reactions that can be achieved using the methods of the present disclosure for olefin metathesis.

Scheme 4A. Photoredox catalsyt-mediated olefin cross-metathesis.

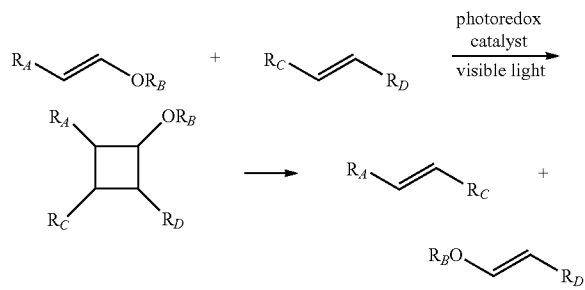

Scheme 4B. Photoredox catalyst-mediated ring closing metathesis

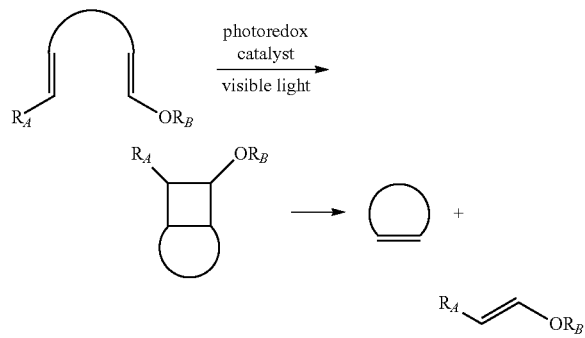

Scheme 4C. Catalytic olefin cross metathesis

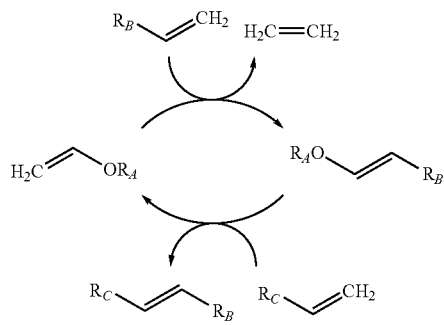

Scheme 4D. Catalytic ring-closing metathesis

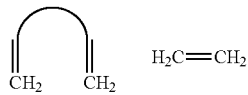

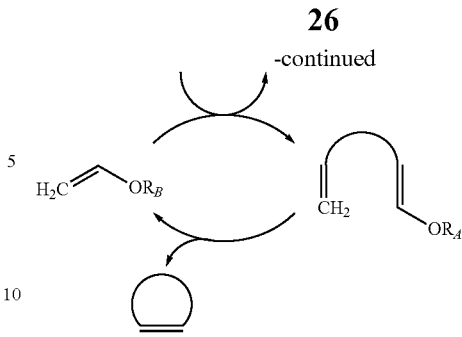

In each of the reactions shown in Schemes 4A to 4D, an organic initiator or catalyst, such as a vinyl ether, is used. Oxidation of the organic initiator or catalyst leads to formation of a [2+2] complex with an alkene reactant and subsequent breakdown of the complex results in formal olefin metathesis. In some embodiments, $R_A$, $R_B$, $R_C$, and $R_D$ groups can each independently be alkyl or aryl groups, which may be optionally substituted. In some embodiments (e.g., Schemes 4A and 4B), a photoredox catalyst is used in the reaction.

Scheme 4A shows an olefin cross metathesis (CM) using a stoichiometric (1:1) molar ratio of a vinyl ether and alkene. Scheme 4B shows a metathesis reaction in which the vinyl ether and alkene moieties are tethered, such that the intramolecular reaction accomplishes a ring-closing metathesis (RCM) event. In some embodiments, both the CM and RCM reactions can be accomplished using catalytic amounts of vinyl ether, as depicted in Scheme 1C and D. Although the method is not limited to vinyl ethers bearing only an ethenyl group, the use of vinyl ethers benefits from formation of gaseous ethylene ($CH_2CH_2$) which helps to drive the reactions toward completion. Without wishing to be bound by theory, it is believed that the ability of the vinyl ether to exchange R groups via metathesis events facilitates catalytic turnover.

The following examples are provided to illustrate, not limit, the invention.

Example 1 provides an electro-organic ROMP method for making polymers. Example 2 represents a protocol for organic-initiated ROMP. The approach utilizes one-electron oxidation of electron-rich vinyl ethers to initiate the process, which can be achieved either electrochemically or via photoredox processes. As will be described below, a photoredox approach enabled high yields of polymerization in short reaction times under mild conditions. The methods of the present application enable unique synthetic control over end group functionality. The success of the photoredox mediation provides new opportunities for spatiotemporal control over production of ROMP-based polymers and materials. Example 3 demonstrates the preparation of linear, non-crosslinked polydicyclopentadiene using a photoredox-mediated organic-initiated ROMP procedure. The monomer, endo-DCPD, can also be copolymerized with norbornene to prepare polymers with varied amounts of cyclopentene units. Example 4 represents a protocol for polymerizing a silyl ether-containing monomer and for deprotecting the resulting polymer.

EXAMPLES

Example 1. Electro-Organic ROMP

Electro-organic ROMP (eo-ROMP) is believed to undergo the mechanistic steps described previously in Scheme 3, where ane-electron anodic oxidation of a vinyl ether A produces the activated radical cation B; subsequent formation of a [2+2] complex C, followed by fragmentation and ring-opening to alleviate ring strain completes the ROMP initiation event arriving at D. Continued propagation with additional cycloalkane monomers ultimately yields ROMP polymers, which can bear a reactive radical cation chain end E. Reductive quenching provides the neutral species F.

Referring to Scheme 5, eo-ROMP was demonstrated with a series of strained monomers 1a-1e and vinyl ether initiators 2a-2c. Cyclic voltammograms (CVs) of the initiators showed oxidation potentials ($E_{ox}$ between 1.43 and 1.30 V (vs SCE). Polymerization conditions included using an undivided cell with a carbon fiber anode and cathode, non-aqueous reference electrode (Ag/AgNO$_3$), CH$_3$NO$_2$ as solvent (tetrahydrofuran, dioxane, CH$_2$Cl$_2$ and other organic co-solvents may also be used), and LiClO$_4$ (1.0 M) as supporting electrolyte. Polymerizations were conducted using a constant potential typically between 1.4 and 1.8 V (vs SCE). Polymerizations were conducted under nitrogen atmosphere using anhydrous reagents and solvents. The initial monomer concentration ([M]$_0$) was 1.5 M and initial initiator concentration ([I]$_0$) was 0.015 M.

Scheme 5. Monomers and initiators for eo-ROMP monomers:

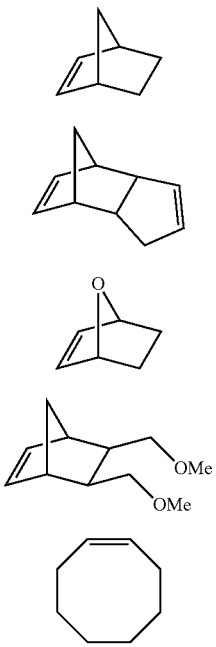

initiators:

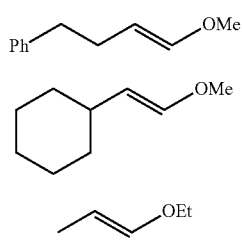

TABLE 1

Polymers from eo-ROMP.

| Monomer | Initiator | [M]$_0$/[I]$_0$ | M$_w$ (kDa) |
|---|---|---|---|
| 1a | 2a | 100/1 | 25.2 |
| 1b | 2b | 83/1 | 14.1 |
| 1c | 2c | 93/1 | 12.2 |
| 1d | 2a | 100/1 | 8.6 |
| 1e | 2c | 96/1 | 4.2 |

Homogeneous electrochemical mediators were able to facilitate the eo-ROMP method at lower cell potentials. Specifically, the use of triarylamines such as triphenylamine, tris(4-bromophenyl)amine, and tris(4-nitrophenyl)amine could be used to effect eo-ROMP at oxidation potentials as low as 1.0 V vs SCE. The use of the mediator was carried out by using a 2:1 molar ratio of alkene initiator to mediator. The mediator was added at the beginning of the polymerization, and the cell potential was then held constant during the polymerization.

Representative Example of eo-ROMP without Electrochemical Mediators

All reactions were done under a nitrogen atmosphere. In a 3-neck round bottom flask, 1.60 g (15.0 mmol) LiClO$_4$, 2.12 g (22.5 mmol) norbornene, and 0.03 mL (0.270 mmol) ethyl propenyl ether were dissolved in 15 mL of CH$_3$NO$_2$ (norbornene was not fully soluble). The flask was capped with septa containing a carbon fiber working electrode, double junction reference electrode (0.1 M TBAB/0.01 M AgNO$_3$), and a carbon fiber counter electrode. A constant potential of 1.30 V vs SCE was applied with stirring of the solution. Once the reaction was complete, 0.200 g of hydroquinone was added to the solution. The solution was stirred for 10 minutes before being poured into MeOH with vigorous stirring. The precipitate was collected via vacuum filtration, washed with MeOH, and dried under vacuum.

Representative Example of eo-ROMP with an Electrochemical Mediator

All reactions were done under a nitrogen atmosphere. In a 3-neck round bottom flask, 1.60 g (15.0 mmol) LiClO$_4$, 0.065 g (0.135 mmol) tris(4-bromophenyl) amine, 2.12 g (22.5 mmol) norbornene, and 0.03 mL (0.270 mmol) ethyl propenyl ether were dissolved in 15 mL of CH$_3$NO$_2$ (norbornene was not fully soluble). The flask was capped with septa containing a carbon fiber working electrode, double junction reference electrode (0.1 M TBAB/0.01 M AgNO$_3$), and a carbon fiber counter electrode. A constant potential of 1.01 V vs SCE was applied with stirring of the solution. The solution turned blue immediately upon electrolysis. Once the reaction was complete, 0.200 g of hydroquinone was added to the solution. The solution was stirred for 10 minutes before being poured into MeOH with vigorous stirring. The precipitate was collected via vacuum filtration, washed with MeOH, and dried under vacuum.

Example 2. Photoredox ROMP

Norbornene (1) was used as a monomer, as this scaffold exhibits relatively high ring strain among common ROMP monomers (Scheme 6). To investigate the direct oxidation of vinyl ethers and propensity for the ensuing radical cation to initiate ROMP, bulk electrolysis was conducted on solutions of 1 containing vinyl ether initiators 2a-2c. After electrolysis of 1 and 2a for 3 h, the reaction solution and electrodes were analyzed for any presence of polynorbornene (PNB). A small amount of material was obtained (3% yield), and analysis by NMR spectroscopy revealed signals consistent with PNB. Moreover, end group signals consistent with the vinyl ether were observed even after precipitation of the polymer to remove any residual small molecule initiator. Gel permeation chromatography (GPC) analysis revealed a number-average molecular weight ($M_n$) of 11.8 kDa (Đ=2.2). Similar results were obtained using initiators 2b and 2c. Although the yields of PNB were low, the results confirm that an anodic oxidation of 2 could initiate polymerization of 1 to give polymer structures consistent with a ROMP mechanism.

Scheme 6. Monomers and initiators.

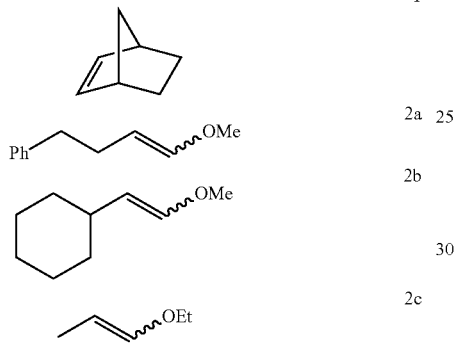

Having confirmed the overall reactivity and viability of an electrolytic ROMP protocol, a photoredox polymerization was carried out.

Photoredox initiation and control of polymerizations can be a powerful method for achieving spatiotemporal control over polymerizations and organic-initiated methods. Notably, photoredox polymerization strategies have focused almost exclusively on controlled radical addition polymerizations in which a redox process is inherent in the activation/deactivation of the polymer chain end. Traditional metal-mediated ROMP, on the other hand, is redox-neutral at all stages, and the metal complex is covalently attached to each chain end until chemically cleaved at the end of the polymerization.

Pyrylium and acridinium salts 3a-3c (Scheme 7) have been identified as good candidates for facilitating photo-oxidation. These mediators are capable of facilitating electron transfer when in the photo-excited state, and were expected to be good oxidizers for the vinyl ether initiators 2a-2c. Whereas the initiators 2a-c display oxidation potentials in the range of 1.43 to 1.30 V vs SCE, the oxidizing power of excited state pyrylium and acridinium cations have been calculated to be 1.74 and 2.06 V vs SCE, respectively.

To explore the photoredox initiation of ROMP, an initial monomer concentration of ca. 2.3 M in $CH_2Cl_2$ was used with a monomer to initiator (1:2a) molar ratio of ca. 100:1. Using a blue LED light source (λ=450-480 nm) in the presence of 3, the best yields were obtained from the pyrylium tetrafluoroborate salt 3a. In general, 3b gave lower yields than 3a, and 3c did not produce any detectable PNB. Thus, all additional experiments were conducted using 3a. The structure of the PNB was confirmed by $^1$H NMR analysis in comparison with an authentic sample prepared via traditional ROMP using the Grubbs $1^{st}$-generation initiator. The glass transition temperature ($T_g$) of samples prepared by either traditional or photoredox mediated ROMP were also found to be consistent with one another. Specifically, the $T_g$ of the ROMP polymer prepared by Ru-mediated ROMP ($M_n$=49.5 kDa) was found to be 53.3° C., versus 49.5° C. for a sample prepared by photoredox initiation ($M_n$=43.9 kDa).

Scheme 7. Pyrylium and acridinium salts

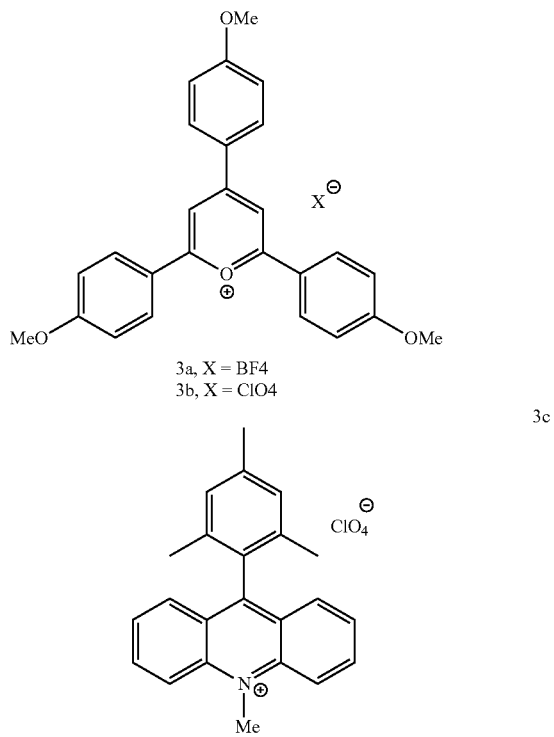

Each initiator 2a-2c was found to give PNB in good yield via the photoredox method; as shown in Table 2. In absence of blue LED light, but with exposure to ambient lighting from the fume hood, slow conversion to give PNB was observed (Table 2, entry 11). In complete absence of light, no polymer was observed. In general, polymerizations under optimized conditions were found to reach maximum conversion in ca. 30-150 min.

TABLE 2

Polymerization results and GPC data for photoredox mediated ROMP $$\text{1} + \text{R}\!\!-\!\!\text{CH=CH-OR'} \;(2) \xrightarrow{\text{3a (3), CH}_2\text{Cl}_2\text{, blue LED light}} \text{PNB}$$

| Entry | Initiator | 1:2:3[a] | $[M]_0$ (M)[b] | Cconversion (%)[c] | Time (min) | $M_{n,\,theo}$ [kDa] | $M_{n,\,exp}$ [kDa] | Đ |
|---|---|---|---|---|---|---|---|---|
| 1 | 2a | 97:1:0.03 | 2.3 | 88 (73) | 30 | 8.0 | 15.1 | 1.7 |
| 2 | 2b | 97:1:0.03 | 2.3 | 92 (80) | 30 | 8.4 | 14.9 | 1.6 |
| 3 | 2c | 106:1:0.03 | 2.4 | 87 (67) | 30 | 9.0 | 15.8 | 1.6 |
| 4 | 2c | 104:1:0.10 | 2.3 | 80 (76) | 150 | 7.8 | 13.5 | 1.4 |
| 5 | 2c | 104:1:0.25 | 2.3 | 90 (73) | 120 | 8.9 | 19.2 | 1.6 |
| 6 | 2c | 48:1:0.03 | 2.2 | 95 (78) | 60 | 4.3 | 8.1 | 1.4 |
| 7 | 2c | 57:1:0.03 | 1.3 | 93 (58) | 120 | 5.0 | 11.5 | 1.4 |
| 8 | 2c | 491:1:0.03 | 5.3 | 51 (25) | 120 | 23.6 | 22.2 | 1.5 |
| 9 | 2c | 494:1:0.03 | 2.2 | 72 (50) | 60 | 33.4 | 43.9 | 1.5 |
| 10 | 2c | 1000:1:0.03 | 2.3 | 61 (47) | 120 | 57.4 | 60.2 | 1.6 |
| 11[d] | 2c | 103:1:0.03 | 2.3 | 53 (29) | 2580 | 5.0 | 7.2 | 1.3 |

[a]Initial molar ratios of monomer, initiator, and mediator.
[b]Initial monomer concentration.
[c]Conversion of monomer, as determined by 1H NMR analysis; isolated yields after precipitation given in parentheses.
[d]Reaction mixture exposed to ambient light from fume hood, without exposure to blue LED light source. Mn, theo is theoretical number-average molecular weight calculated from initial monomer to initiator ratio and % conversion of monomer. Mn, exp is experimental number-average molecular weight, calculated from a weight-average molecular weight determined by GPC using multi-angle laser light scatters. Dispersities (Đ) determined by GPC analysis.

The amount of photoredox mediator 3a that was required for successful polymerization was found to be quite low. Specifically, consistent $M_n$ values and % conversions were observed when using mediator to initiator ratios (3a:2) of 0.03 to 0.25 (Table 2, entries 3-5). Higher loading of mediator did manifest some bimodality in the GPC traces, with high molecular weight shoulders appearing with increasing amounts of mediator. It is believed that this may be due to increased concentration of active chain ends and therefore greater extent of chain-chain coupling. The initial monomer concentration could be varied, with even very high concentrations (5.3 M) giving successful polymerizations (entry 8). This indicates that bulk polymerization using liquid monomers is possible using the methods of the present invention. Varying the initial monomer to initiator ratio provided some degree of control over the final $M_n$ (entries 3, 6-10). A consistent correlation was observed between the theoretical and experimental $M_n$ values, with experimental values generally being greater than expected for the given monomer to initiator ratios and % conversions. Dispersities were found to vary between 1.3 and 1.7 across different experiments, and remained consistent during the course of each polymerization.

Figure 1B:
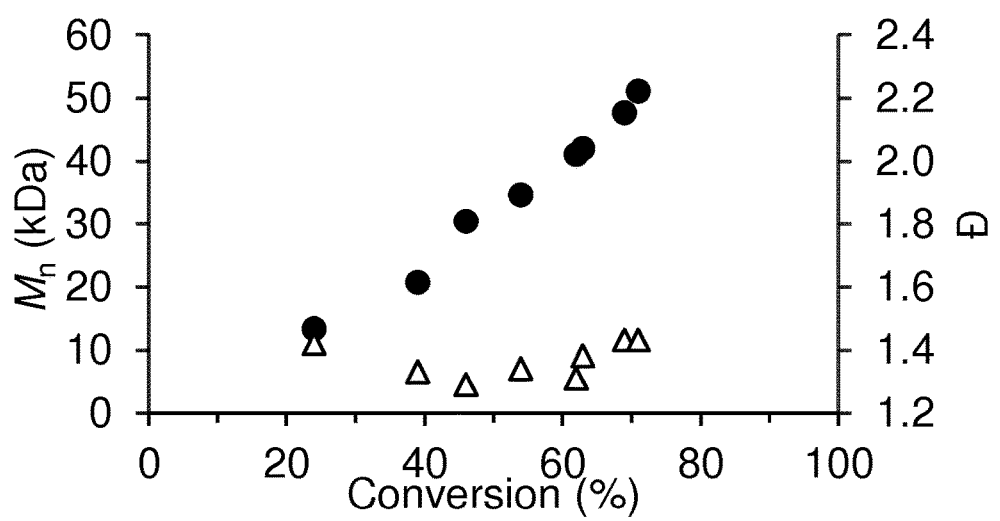

During the course of the polymerization, a gradual increase in $M_n$ was observed with increasing conversion of monomer, consistent with the chain growth nature of ROMP (FIGS. 1A and 1B). Although there was a positive correlation, the linearity was not as precise as traditional "living" ROMP using, for example, Grubbs $3^{rd}$-generation initiator. This could be ascribed to the relative rates of initiation and propagation in the photoredox method, or any number of early termination events.

Figure 2:
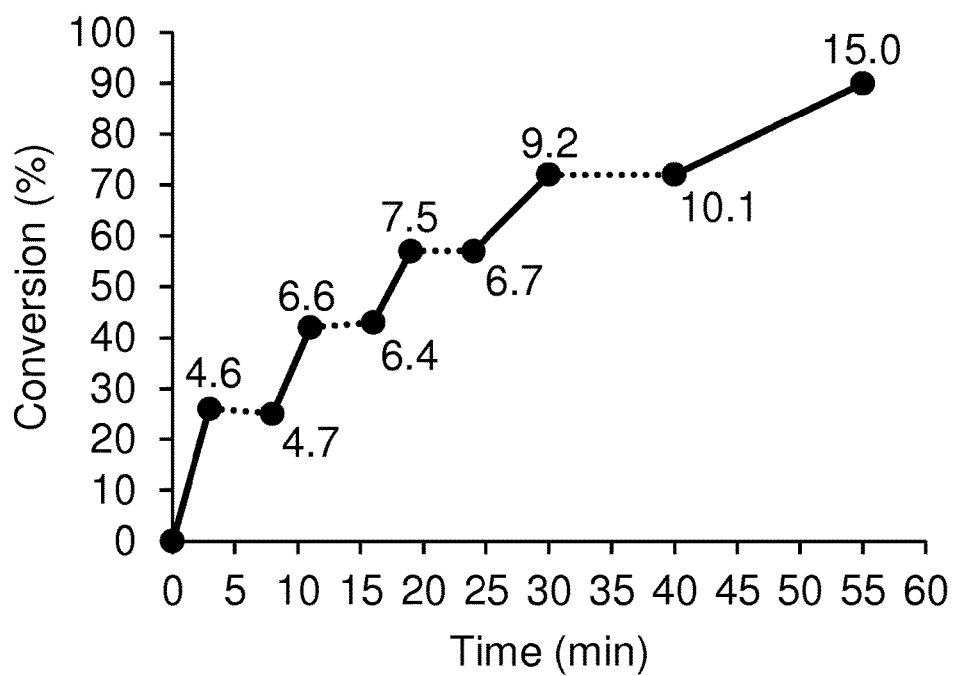
FIG. 2 is graph showing % conversion of an embodiment of a monomer vs time, solid lines indicate periods of exposure to blue LED light. Dotted lines indicate periods in the dark, data point labels indicate Mn values (kDa). Initial conditions: monomer to initiator 1:2a ratio=100:1, $[1]_0$=1.9 M.

Mechanistically, without wishing to be bound by theory, it is believed that oxidation of the vinyl ether proceeds via electron transfer to the excited pyrylium cation to give the vinyl ether radical cation (e.g., A→B, Scheme 3, above). Notably, the propagating radical cation chain end likely forms a dynamic redox couple with the reduced pyrylium species. The reversibility would manifest an ability to reductively quench and terminate polymerization, and then reinitiate upon exposure to blue light. This temporal control was investigated by monitoring the polymerization with intermittent exposure to blue LED light. As shown in FIG. 2, polymerization ceased in the dark and was reinitiated upon exposure to blue light. Specifically, little to no further conversion of monomer in the dark was observed as determined by $^1$H NMR spectroscopy, and no significant changes in $M_n$ was observed as judged by GPC analysis. This suggested that the pyrylium cation and vinyl ether form a dynamic redox couple and that the radical cation chain end is reductively quenched during the polymerization. Furthermore, the correlation between % conversion and increasing $M_n$ during the alternating light/dark cycles was consistent with chain end activation/deactivation cycles, as opposed to photo-mediated initiation of new polymer chains upon re-exposure to light.

The organic-initiated ROMP approach utilizes one-electron oxidation of electron-rich vinyl ethers to initiate the process, which can be achieved either electrochemically or via photoredox processes. A photoredox approach enabled high yields of polymerization in short reaction times under mild conditions.

Synthetic Procedure

Acetonitrile ($CH_3CN$) and nitromethane ($CH_3NO_2$) were dried over calcium hydride and distilled prior to use. Dichloromethane ($CH_2Cl_2$) and tetrahydrofuran (THF) were obtained from a solvent purification system. $^1$H and $^{13}$C NMR spectra were recorded on Bruker AVance 300 MHz or 500 MHz spectrometers. Chemical shifts are reported in delta (δ) units, expressed in parts per million (ppm) downfield from tetramethylsilane using the residual protio-solvent as an internal standard ($CDCl_3$, $^1$H: 7.27 ppm and $^{13}$C: 77.0 ppm). Data are presented as follows: chemical shift, multiplicity (s=singlet, d=doublet, dd=doublet of doublets, br=broad, m=multiplet), coupling constants (Hz) and integration. UV-visible spectroscopy data were collected on an Agilent 8453 UV-vis spectrophotometer. Gel permeation chromatography (GPC) was performed using a GPC setup consisting of: a Shimadzu pump, 3 in-line columns, and Wyatt light scattering and refractive index detectors with tetrahydrofuran (THF) as the mobile phase. Number-average molecular weights ($M_n$) and weight-average molecular weights ($M_w$) were calculated from light scattering. All polymerizations were carried out under an inert atmosphere of nitrogen in standard borosilicate glass vials purchased from Fisher Scientific with magnetic stirring unless otherwise noted. Irradiation of photochemical reactions was done using a 2 W Miracle blue LED indoor gardening bulb purchased from Amazon. Electrochemical experiments were performed on a CH Instruments 1100B potentiostat using a 25 mL 3-neck round bottom flask as an undivided cell. Cyclic voltammetry experiments were done using a glassy carbon working electrode (3 mm diameter), Pt counter electrode (Premier Lab Supply), and Ag/0.01 M AgNO$_3$ (0.1 M tetrabutylammonium tetrafluoroborate in CH$_3$CN) reference electrode. Electro-organic ROMP experiments were done using a carbon fiber (Zoltek) working electrode, carbon fiber counter electrode, and Ag/0.01 M AgNO$_3$ (0.1 M tetrabutylammonium tetrafluoroborate in CH$_3$CN) reference electrode. $T_g$ values were determined using a Perkin-Elmer DMA 8000. Analysis was performed on powdered samples held within material pockets supplied by Perkin-Elmer. Samples were analyzed using the Single-Cantilever Geometry Fixture with the following settings: heating rate=3.0° C./min, frequency=1 Hz, static force=1.0 N. Reported $T_g$ values refer to the temperature corresponding to the peak of the tan delta curve. Initiators 2a and 2b were prepared according to literature procedures. The pyrylium tetrafluoroborate (3a) and perchlorate (3b) salts were prepared according to literature procedures. All other reagents and solvents were obtained from commercial sources and used as received unless otherwise noted.

General Procedure for the Preparation of Initiators 2a and 2b

Scheme 8. Preparation of initiators 2a and 2b.

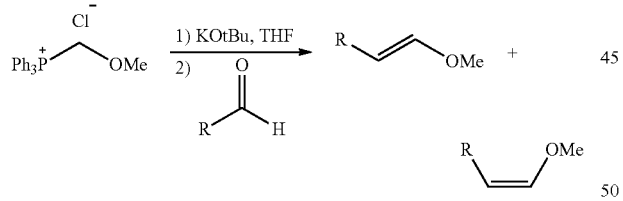

A solution of potassium tert-butoxide (5.1 g, 45.0 mmol, 1.5 equiv.) in 10 mL of dry THF was slowly added to a solution of (methoxymethyl)triphenylphosphonium chloride (15.4 g, 45.0 mmol, 1.5 equiv.) in 40 mL of dry THF. After stirring the red solution at 23° C. for 45 min, a solution of the corresponding aldehyde (30.0 mmol, 1.0 equiv.) in 10 mL of dry THF was slowly added and allowed to stir at 23° C. for an additional 2 h. The solvent was removed under vacuum and the residue was diluted with hexanes. The organic layer was washed with water (3×100 mL) and dried over Na$_2$SO$_4$. The solvent was removed under reduced pressure and the resulting residue was purified by filtering through a plug of silica with diethyl ether as the eluent. In some cases, residual triphenylphosphine was removed by stirring overnight with 10 equiv of iodomethane and filtration through a plug of silica with diethyl ether as the eluent.

1-methoxy-4-phenyl butene (2a)

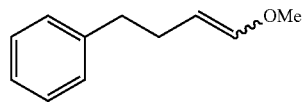

(2a)

was prepared according to the above procedure in 92% yield (1:2 cis to trans ratio); spectral data were consistent with literature values.

2-cyclohexyl-1-methoxyethylene (2b)

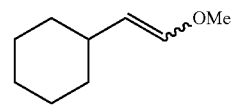

(2b)

was prepared according to literature procedures in 82% yield (1:2 cis to trans ratio). $^1$H NMR (300 MHz, CDCl$_3$) δ=6.29 (d, J=12 Hz, 1H, trans) 5.79 (d, J=6.0 Hz, 0.5H, cis) 4.70 (dd, J=6.0 Hz, 9 Hz, 1H, trans) 4.24 (dd, J=3 Hz, 6 Hz, 0.5H, cis) 3.58 (s, 1.5H, cis) 3.50 (s, 3H, trans) 2.42 (m, 0.5H, cis) 1.88 (m, 1H, trans) 1.68 (m, 4H, cis/trans) 1.16 (m, 9H, cis/trans). $^{13}$C NMR (125 MHz, CDCl$_3$) δ=145.7, 144.5, 113.4, 109.7, 59.5, 55.8, 36.9, 34.4, 35.4, 33.4, 26.2, 26.1, 26.0.

Scheme 9. Preparation of 2,4,6-tri-(p-methoxyphenyl) pyrylium tetrafluoroborate (3a)

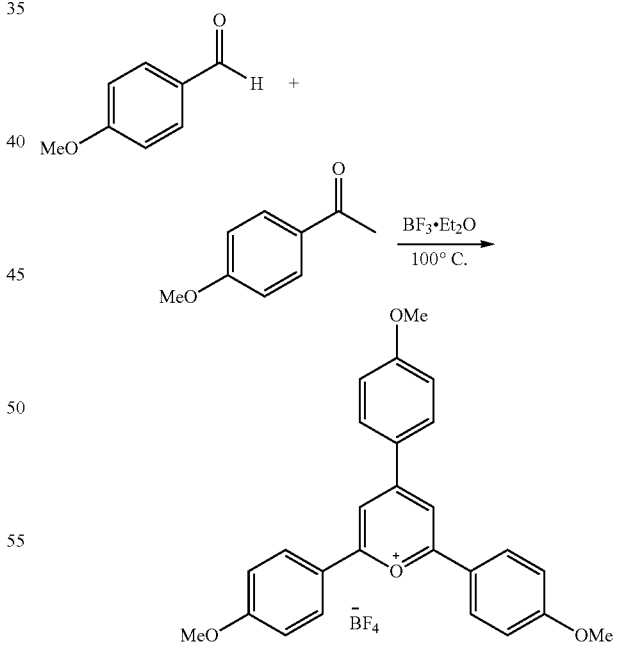

To a flask containing p-anisaldehyde (6.1 mL, 50.3 mmol, 1 equiv) and p-acetylanisole (15.07 g, 100.4 mmol, 2 equiv) was added BF$_3$.Et$_2$O (15.0 mL, 121.5 mmol, 2.4 equiv) dropwise over 5 min. The solution was heated in an oil bath set to 100° C. After 2 h, the reaction was removed from heat. Once at room temperature, the crude material was diluted with acetone (200 mL) and Et$_2$O (250 mL) and filtered to give a rust-colored solid. The solids were washed with warm acetone (175 mL) and dried under vacuum to give the pyrylium tetrafluoroborate as an orange solid (5.01 g, 20%). Spectral data matched those previously reported.

2,4,6-tri-(p-methoxyphenyl) pyrylium perchlorate (3b) was prepared according to literature procedures in 10% yield, spectral data were consistent with literature values.

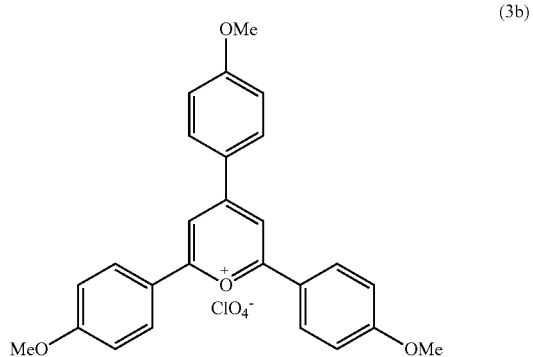

General Procedure for Cyclic Voltammetry of Initiators 2a-2c

The general procedure was as follows: In a drybox, a 3-neck round bottom flask was charged with a magnetic stir bar, anhydrous CH$_3$NO$_2$ (15 mL), and lithium perchlorate (15.0 mmol). The indicated initiator (0.075 mmol) was then added to the mixture. The flask was equipped with a glassy carbon anode (3 mm diameter), Pt basket cathode, and Ag/AgNO$_3$ reference electrode (0.01 M AgNO$_3$/0.1 M tetrabutylammonium tetrafluoroborate in CH$_3$CN) and then the apparatus was sealed using rubber septa. The electrochemical cell was then removed from the drybox and the solution was placed under a positive pressure of N$_2$ and stirred at room temperature. Stirring was stopped prior to connecting to the potentiostat. The cyclic voltammograms for the initiators were typically taken from 0.5 V to 2.5 V vs. Ag/AgNO$_3$ with a sweep rate of 0.10 V/s. Ferrocene (0.15 mmol) was added as an internal standard after each voltammogram. All potentials are reported in V vs. SCE.

General procedure for electro-organic ROMP. Electro-organic ROMP experiments were done using a carbon fiber (Zoltek) working electrode, carbon fiber counter electrode, and Ag/0.01 M AgNO$_3$ (0.1 M tetrabutylammonium tetrafluoroborate in CH$_3$CN) reference electrode in a double junction chamber. The carbon fiber electrodes were 40 mm in length (excluding the copper lead) and 15 mm of the carbon fiber was submerged in the electrolyte solution during electrolysis. In the drybox, a 3-neck round bottom flask was charged with a magnetic stir bar, lithium perchlorate (15.0 mmol) and CH$_3$NO$_2$ (15 mL). To the solution was added norbornene (23.2 mmol, 100 equiv.) and initiator (0.23 mmol, 1 equiv.). The electrodes were attached onto the cell and the apparatus was sealed using rubber septa. The electrochemical cell was then removed from the dry box and placed under a positive pressure of N$_2$. The electrodes were connected to the potentiostat and bulk electrolysis with a constant potential of 1.43 V vs SCE was started with constant stirring. After the current reached background levels, the electrolysis was stopped and hydroquinone (2.3 mmol, 10 equiv) was then added to the solution. The carbon fiber electrodes were removed and soaked in THF. The quenched solution and electrode soaks were added to rapidly stirring methanol to precipitate the polymer. The resulting solids were redissolved in THF, passed through a syringe filter (2 μm) to remove any carbon fiber particulates, and reprecipitated into methanol. The resulting solids were dried under vacuum and analyzed by $^1$H NMR spectroscopy and GPC.

General procedure for photoredox mediated ROMP. All polymerizations were set up in a drybox under an inert atmosphere of nitrogen. Irradiation of the sealed vials with blue LEDs was done outside of the drybox. A 2-dram vial was equipped with a magnetic stir-bar, 2,4,6-tri-(p-methoxyphenyl) pyrylium tetrafluoroborate (3a, 3.0-25.0 mol %), and norbornene (48-1000 equiv. relative to 2). The solvent, CH$_2$Cl$_2$ (2.2-2.5 M), and initiator 2 (1 equiv.) were added to the vial. The vial was sealed with a Teflon-coated screw cap and brought out of the drybox. The mixture was irradiated for the indicated period of time. The reaction progress and $M_n$, were monitored by $^1$H NMR spectroscopy and GPC, respectively. Upon completion, hydroquinone (5 equiv.) was added to the reaction mixture, which was then passed through a short plug of alumina. The polymer solution was then added dropwise into an excess of methanol (MeOH) or dry acetonitrile (CH$_3$CN) to cause precipitation of the polymer. Note: As a control, the same setup was performed outside the drybox, and then the reaction mixture sparged with N$_2$ for 15 minutes before irradiation. This led to a significant decrease in polymer formation (only ~30% conversion of monomer as determined by $^1$H NMR spectroscopy) compared to reactions setup inside the drybox.

Example 3. Photoredox ROMP with Co-Monomers

Polymers with more complex functionality led to examination of a variety of other common ROMP monomers. Specifically, the polymerization of dicyclopentadiene (DCPD, 2, Scheme 10) was examined, which in its commercially available form exists as almost exclusively the endo isomer. While catalyst systems can enable the preparation of linear polyDCPD (2→3, Scheme 10, bottom), many catalysts form insoluble, crosslinked polymer networks resulting from either olefin metathesis or olefin addition reactions of the cyclopentene moiety (Scheme 10, top). Furthermore, the nature of the crosslinking process means that the metal catalysts used for polymerization remain trapped inside the final polymer, which can be problematic in some cases.

Scheme 10. Polymerization of dicyclopentadiene.

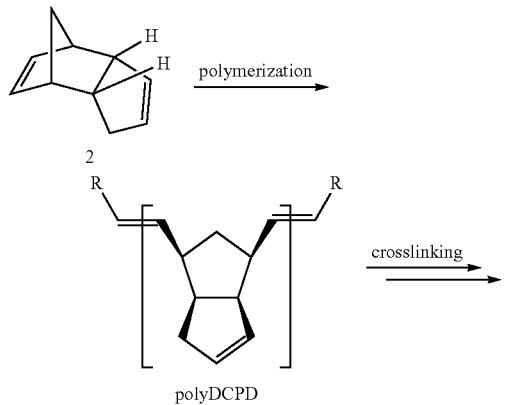

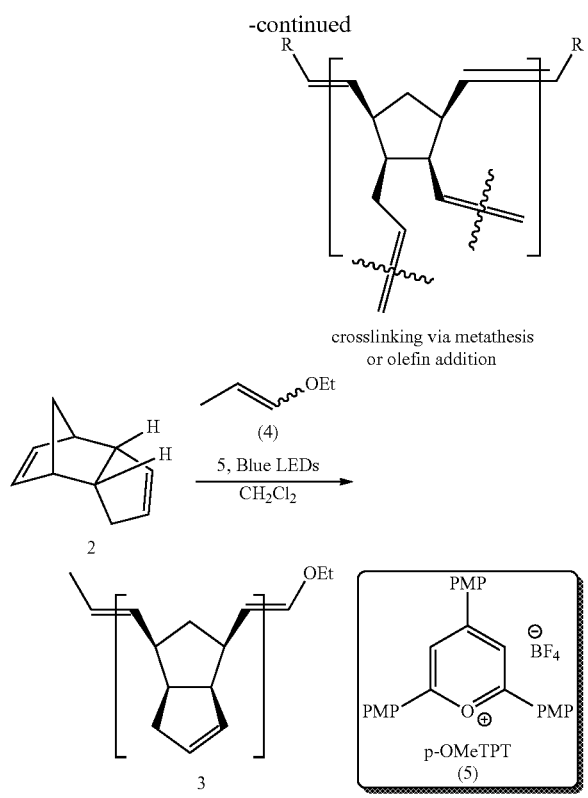

Monomer 2 was found to be successfully polymerized using enol ether initiator 4 and photoredox mediator 5 upon exposure to blue light in an organic-initiated ROMP (Scheme 2, bottom). Under these conditions, conversion of 2 was found to be only 15%, and the polymer that was formed was of low molecular weight (Mn=3.8 kDa; Đ=1.1). In comparison, the use of norbornene (1) as monomer often leads to conversions of >80%. The polyDCPD (3) remained soluble in common organic solvents (e.g., THF, $CH_2Cl_2$, and toluene) and showed no signs of crosslinking by 1H-NMR analysis.

Attempts to optimize this polymerization to achieve higher conversion are outlined in Table 3. Notably, independently varying the initial monomer concentration (entries 1-3) or pyrylium (5) loading (entry 4) resulted in no significant changes in conversion. Carrying out the polymerization at 4° C. gave a slight improvement, as did decreasing the initial ratio of monomer to initiator. In all cases, the molecular weights of the final polymer remained low.

TABLE 3

Polymerization of dicyclopentadiene.

| Entry | 2:4:5[a] | $[2]_0$ (M) [b] | Temp. (° C.) | Conversion[c] |
|---|---|---|---|---|
| 1 | 102:1:0.07 | 1.75 | 23 | 15% |
| 2 | 100:1:0.07 | 2.80 | 23 | 13% |
| 3 | 101:1:0.07 | 1.26 | 23 | 13% |
| 4 | 102:1:0.25 | 1.75 | 23 | 15% |
| 5 | 100:1:0.07 | 1.75 | 4 | 19% |
| 6 | 51:1:0.07 | 1.76 | 23 | 20% |

[a]Initial molar ratio of 2, 4, and 5.
[b] Initial concentration of 2 in $CH_2Cl_2$.
[c]Conversion determined by comparison of monomer and polymer peaks by 1H-NMR spectroscopy.

Figure 3:
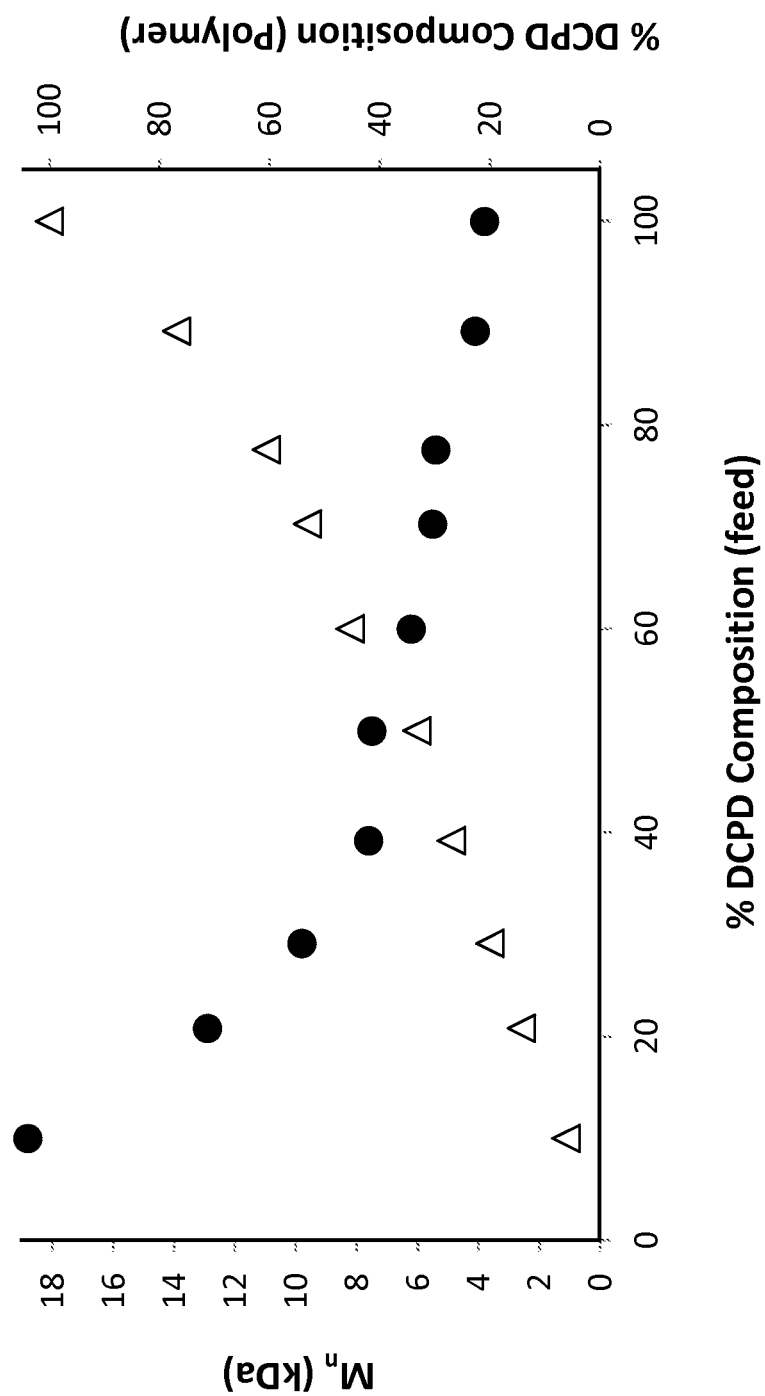
FIG. 3 is a graph showing Mn (•) and % dicyclopentadiene ("DCPD") incorporated into an embodiment of a polymer polymer (Δ) vs. % DCPD loaded.

Initially, the presence of monomer 2 was evaluated to determine whether its presence was detrimental to the polymerization of norbornene (1). Copolymers derived from monomers 1 and 2 were prepared using a feed ratio of monomers (i.e., 1+2) to initiator 4 of 100:1. FIG. 3 shows good correlation of endo-DCPD (2) loading on the composition and Mn of the final polymer. Although the amount of 2 incorporated is less than the theoretical amount based upon the feed ratio, the % incorporation shows a consistent increase with increasing endo-DCPD content. As expected, higher initial loadings of monomer 2 led to a significant decrease in the Mn of the final polymer from 18.8 kDa (~10% DCPD) to 4.1 kDa (~90% DCPD) which were accompanied by significantly lower conversions and isolated yields. Nevertheless, this highlights how organic-initiated ROMP can be amenable to the tuning of materials properties (e.g., Tg) through the preparation of copolymers. Interestingly, in contrast to the low conversion of 2 at high loadings of this monomer, when small amounts of 2 were present, this monomer displayed conversions of 50-60% suggesting that decreased reactivity of the monomer was not the cause for the low conversions observed with higher DCPD loadings.

Figure 4:
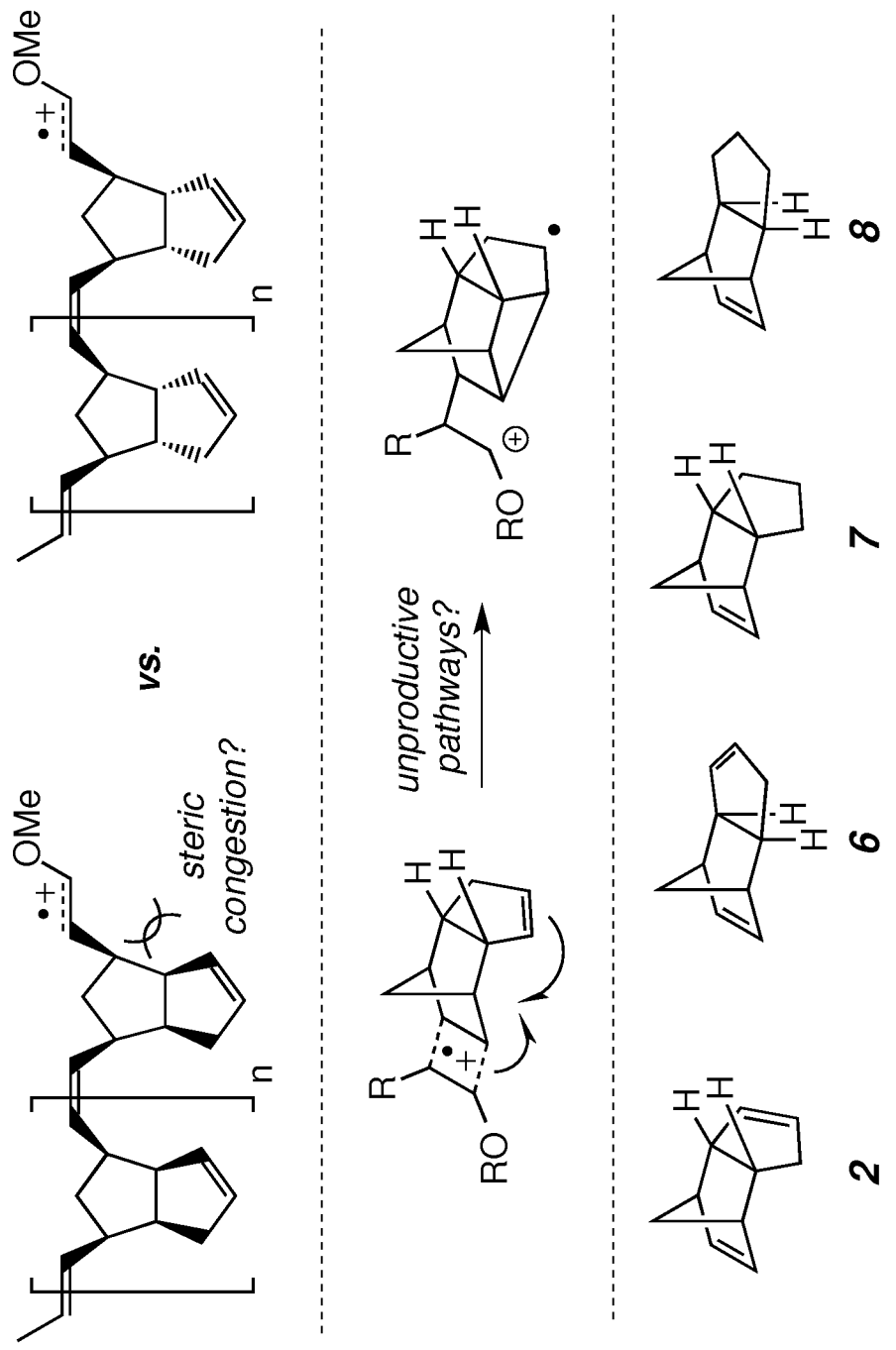
FIG. 4 is an illustration of embodiments of reaction mechanisms and monomers.

In an attempt to better understand the reasons for the low conversion, two potential explanations were considered. The first scenario involves the bulk of the extra cyclopentene ring in monomer 2 (compared with norbornene 1), which can deter polymerization from proceeding to high conversion through a steric effect. The radical cation likely approaches the monomer's convex face opposite this cyclopentene ring, making steric interactions in the monomer unlikely for decreased conversion. However, the endo orientation results in a ring-opened structure where the propagating chain end is syn to the cyclopentene ring, which may attenuate the rate of new monomer incorporation (FIG. 4, top). Alternatively, the presence of the second olefin in the monomer may create problems due to its proximity to the propagating radical cation (FIG. 4, middle). The intramolecular reactivity of neighboring olefins with radical cation intermediates is well-documented, and even utilized for the development of cascade type reactivity. Notably, these undesired side reactions could arise either during formation of the cyclobutane radical cation (C, Scheme 3, above), or through the subsequent ring opened intermediate (E, Scheme 3, above) during propagation.

To probe these two possible pathways, monomers 6-8 were prepared in order to compare their performance with 2 (FIG. 4, bottom). The exo-configuration of monomer 6 would be expected to perform well if the problem was strictly sterics, whereas monomers 7 and 8 were chosen to remove the possibility of any undesired intramolecular reactivity with the extra olefin. Previous studies on the polymerization of monomers 2, 6, and 7 using Ru-alkylidene ROMP catalysts have found that exo-DCPD (6) polymerizes approximately 20 times faster than endo-DCPD (2). Thus, while this effect is primarily steric in nature, coordination of the Ru catalyst by the cyclopentyl olefin does occur to a small extent. In contrast, it is believed that the poor behavior of 2 under organic-initiated conditions was most likely due to undesired reactivity of the proposed radical intermediates given the known proclivity of these species to undergo intramolecular reactions with olefins.

Figure 5:
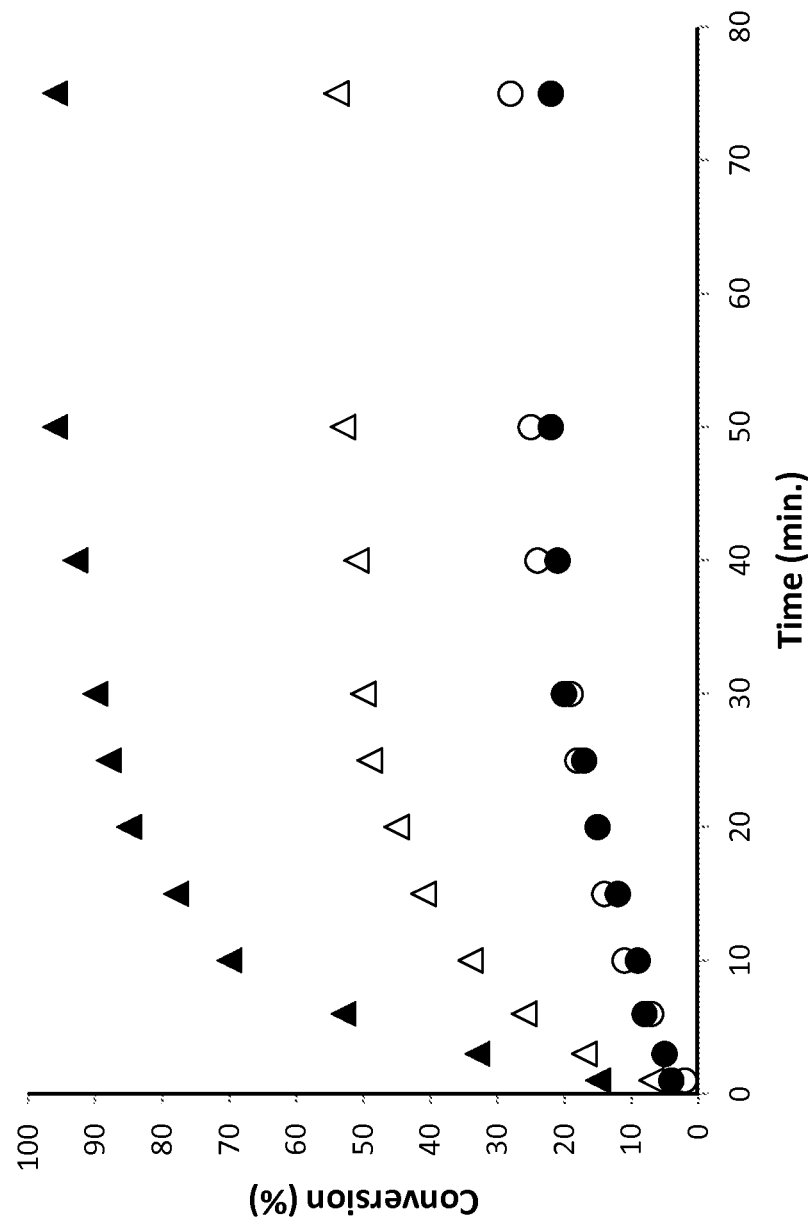
FIG. 5 is a graph showing the conversion vs. time for embodiments of monomers (monomers 2 (unfilled circle), 6 (filled circles), 7 (unfilled triangles), and 8 (filled triangles)) as determined by 1H-NMR spectroscopy.

Monomers 2, 6, 7, and 8 each undergo polymerization to varying degrees (FIG. 5). The exo-DCPD monomer (6) was found to perform poorly (<20% conversion), analogously to what was observed with the endo-isomer. In contrast, the endo-dihydroDCPD monomer (7) performed significantly better, typically reaching 50-60% conversion. Unfortunately, the resulting polymer appeared to display poor solubility in dichloromethane, which likely contributes to conversion not proceeding past this point. Finally, exo-dihydroDCPD (8) performed exceptionally well, reaching >90% conversion. This level of conversion is on par with what was previously seen with the parent norbornene monomer 1. Taken together, the success of monomers 7 and 8 as well as the poor performance of monomers 2 and 6 suggested that the low conversions of the latter monomers can be ascribed to the extra unsaturation in the cyclopentene moiety and not steric impedance.

Based on control experiments, it does not appear that the photoredox-mediated ROMP is intolerant of all olefinic groups. When norbornene (1) was polymerized using enol ether 4 in the presence of cyclopentene (ratio of cyclopentene:1:4=25:75:1), a conversion of 79% was observed for norbornene, consistent with examples where cyclopentene is absent. Additionally, no incorporation of cyclopentene was observed by 1H-NMR analysis of the final polymer. This provides further evidence that the conversion-limiting process in the polymerizations of endo- and exo-DCPD is an intramolecular process. In addition to demonstrating new monomers that can be utilized for organic-initiated ROMP, these studies also provide insight into mechanistic considerations with regards to future monomer design.

Figure 6:
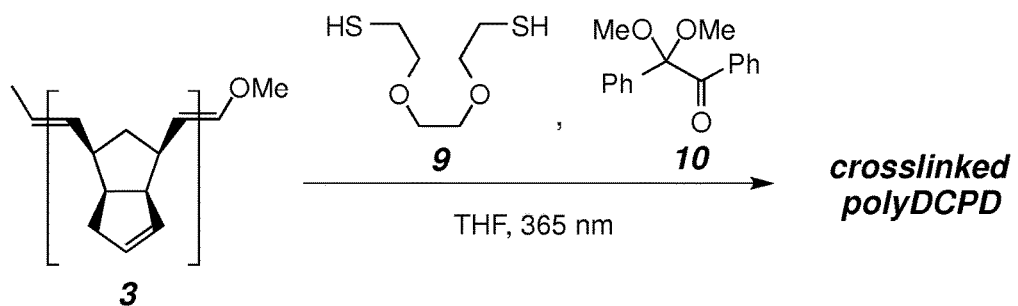
FIG. 6 is a schematic illustration of an embodiment of a crosslinking reaction of polyDCPD using a thiol-ene reaction (top) and a photograph (bottom) of an embodiment of a polymer in THF before crosslinking (bottom left) and after UV promoted crosslinking (bottom right).
Figure 6:
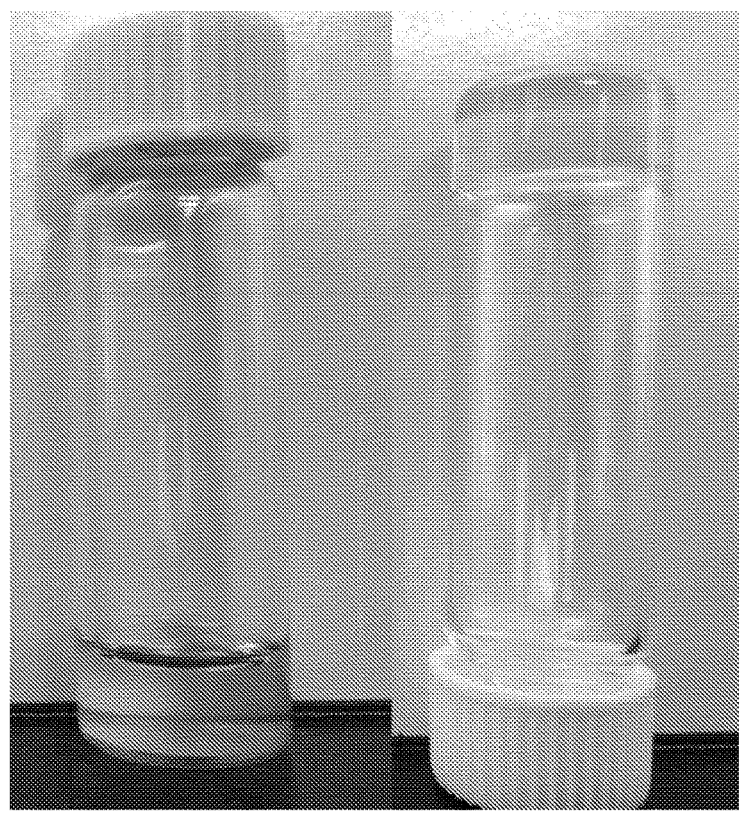

The ability to prepare linear polyDCPD that has not undergone crosslinking is beneficial in terms of the processability of the material and the ability to control when crosslinking occurs. Current technologies typically utilize Reaction Injection Molding (RIM), where the monomer and initiator are injected directly into a mold and polymerize to form a molded, crosslinked polymer. The possibility of isolating the linear polymer and then carrying out a subsequent reaction to form crosslinked polyDCPD under fully organic-initiated conditions was explored (FIG. 6). Thiol-ene reactivity was used to achieve the crosslinking due to the mild conditions, high reactivities, and tunable product properties that have been demonstrated with this approach. Irradiation of a THF solution of polymer 3 in the presence of dithiol 9 and photoinitiator 10 with a hand held UV lamp ($\lambda$=365 nm) led to gelation within 30 minutes (FIG. 6).

Materials and Methods

Dichloromethane ($CH_2Cl_2$) and tetrahydrofuran (THF) were obtained from a solvent purification system. $^1$H and $^{13}$C NMR spectra were recorded on Bruker AVance 300 MHz or 500 MHz spectrometers. Chemical shifts are reported in delta ($\delta$) units, expressed in parts per million (ppm) downfield from tetramethylsilane using the residual protio-solvent as an internal standard ($CDCl_3$, $^1$H: 7.26 ppm and $^{13}$C: 77.0 ppm). Data are reported as follows: chemical shift, multiplicity (s=singlet, d=doublet, dd=doublet of doublets, br=broad, m=multiplet), coupling constants (Hz) and integration. Gel permeation chromatography (GPC) was performed using a GPC setup consisting of: a Shimadzu pump, 3 in-line columns, and Wyatt light scattering and refractive index detectors with tetrahydrofuran (THF) as the mobile phase. Number-average molecular weights ($M_n$) and weight-average molecular weights ($M_w$) were calculated from light scattering. All polymerizations were carried out under an inert atmosphere of nitrogen in standard borosilicate glass vials purchased from Fisher Scientific with magnetic stirring unless otherwise noted. Irradiation of photochemical reactions was done using a 2 W Miracle blue LED indoor gardening bulb purchased from Amazon. $T_g$ values were determined using a Perkin-Elmer DMA 8000. Analysis was performed on powdered samples held within material pockets supplied by Perkin-Elmer. Samples were analyzed using the Single-Cantilever Geometry Fixture with the following settings: heating rate=3.0° C./min, frequency=1 Hz, static force=1.0 N. Reported $T_g$ values refer to the temperature corresponding to the peak of the tan delta curve. The pyrylium tetrafluoroborate (5) salt was prepared according to literature procedure. Monomer 2 was dissolved in $Et_2O$, filtered over neutral alumina, and concentrated prior to use. Tetrahydrofuran (THF) for crosslinking studies was filtered over neutral alumina and sparged with $N_2$ for 10 minutes prior to use. All other reagents and solvents were obtained from commercial sources and used as received unless otherwise noted.

Preparation of Monomers and Purity Commercially available monomer 2 was found to contain approximately 2% of exo-isomer 6 by $^1$H-NMR analysis. This material was dissolved in $Et_2O$, filtered over neutral alumina, and concentrated prior to use. Monomer 6 was prepared according Nelson, G. L.; Kuo, C.-L. Synthesis 1975, 105-106 and found to contain approximately 3% of endo isomer 2 by $^1$H-NMR analysis. Monomer 7 was prepared according to Masjedizadeh, M. R. et al., J. Org. Chem. 1990, 55, 2742-2752 and found to contain<2% of exo-isomer 8 by $^1$H-NMR analysis.

Referring to Scheme 11, monomer 8 was prepared according to PCT publication WO2009/003711 with modifications. The material obtained using this method was found to contain approximately 8% of endo-isomer 7 based on $^1$H-NMR analysis.

Scheme 11. Synthesis of monomer 8.

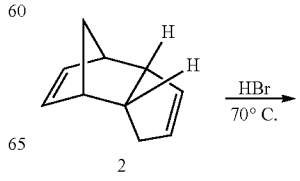

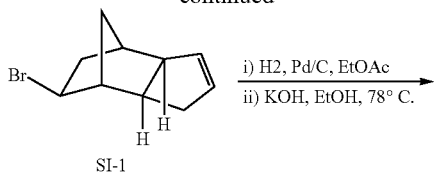

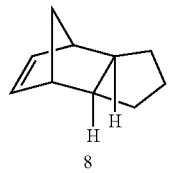

To a 200 mL flask was added endo-dicyclopentadiene (2, 40.73 g, 308 mmol, 1 equiv) followed by HBr (48% aqueous, 68 mL, 601 mmol, 2 equiv). The reaction was heated to 70° C. and maintained for 14 hours. After cooling to room temperature, the mixture was diluted with water (150 mL), and extracted with Et$_2$O (3×125 mL). The combined organic layers were washed with saturated aqueous NaHCO$_3$ (75 mL) and dried over MgSO4. The product was purified by distillation under reduced pressure (52° C., 250 mtorr) to give SI-1 as a pale-yellow oil (50.0 g, 76% yield), which was utilized for subsequent transformations.

A flask containing HBr adduct SI-1 (15.03 g, 70.5 mmol, 1 equiv) 10% Pd/C (1.5 g, 1.41 mmol Pd, 0.02 equiv) and EtOAc (30 mL) was evacuated and backfilled with H$_2$ (balloon) a total of five times and allowed to stir under H$_2$. The reaction was periodically analyzed using $^1$H NMR spectroscopy until no more olefin signals were present (if conversion ceased prior to complete disappearance, additional Pd/C was added). Once the olefin signals were gone, the system was evacuated and backfilled with N$_2$ a total of 4 times and the liquid filtered over celite (EtOAc eluent). The solvent was removed under reduced pressure and the crude material taken directly onto the next step.

To a flask containing the crude oil was added KOH (11.9 g, 212.1 mmol, 3 equiv) as a solution in 95% EtOH (45 mL). The mixture was heated to reflux. After 21 hours, the reaction was cooled to room temperature, diluted with water (150 mL) and extracted with Et$_2$O (2×100 mL). The combined organic layers were washed with water (3×75 mL) and dried over MgSO$_4$. The crude product was purified by distillation under reduced pressure (51-53° C., 10 torr) to give 8 as a colorless oil (4.91 g, 52% yield, 2 steps). Spectral data matched those previously reported.

Copolymerizations Utilizing Norbornene and Endo-Dicyclopentadiene

Scheme 12. Norbornene and endo-dicyclopentadiene copolymerization.

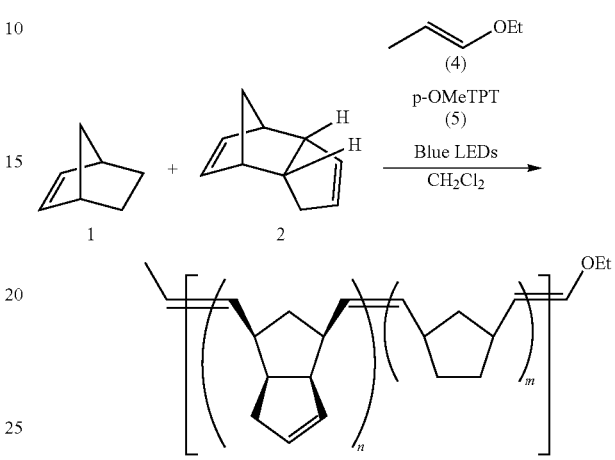

General Procedure: A 2 dram vial containing a magnetic stirbar and p-OMeTPT (5, 1.6 mg, 0.003 mmol, 0.07 equivs) was taken into a glovebox maintained under nitrogen atmosphere. To this vial were added norbornene (1) and endo-dicyclopentadiene (2) (1+2=4.5 mmol 100 equiv). Dichloromethane (2 mL) was added, followed by ethyl propenyl ether (5 µL, 0.045 mmol, 1 equiv). The vial was capped, removed from the glovebox, and irradiated with blue LEDs (λ=450-480 nm) for 5 hours. A small scoop of hydroquinone was added to the vial and an aliquot taken for analysis to determine conversion of each monomer. The contents of the vial were then diluted with CH$_2$Cl$_2$ and filtered over neutral alumina to remove any remaining p-OMeTPT. This CH$_2$Cl$_2$ mixture was concentrated down to approximately 5 mL and precipitated into MeOH (100 mL). The solids were collected by filtration, washed with MeOH, and dried under reduced pressure to give the final polymer.

TABLE 4

Conversion and molecular weight data for norbornene and endo-DCPD copolymers.

| Entry | norbornene (NB, 1) (equivs) | DCPD (2) (equivs) | % DCPD (feed) | % DCPD (polymer) | M$_n$ (kDa) | Đ | NB conv. (%) | DCPD conv (%) | Total conv. (%) | Isolated Yield (%) | T$_g$ (° C.) |
|---|---|---|---|---|---|---|---|---|---|---|---|
| 1 | 90 | 10 | 10 | 6 | 18.8 | 1.6 | 81 | 60 | 79 | 66 | 54.5 |
| 2 | 80 | 21 | 20.8 | 14 | 12.9 | 1.3 | 72 | 51 | 68 | 43 | 62.4 |
| 3 | 73 | 30 | 29.1 | 20 | 9.8 | 1.4 | 54 | 35 | 49 | 38 | 66.2 |
| 4 | 62 | 40 | 39.2 | 27 | 7.6 | 1.3 | 36 | 32 | 35 | 30 | 71.7 |
| 5 | 50 | 50 | 50 | 33 | 7.5 | 1.3 | 33 | 22 | 29 | 21 | 78.4 |
| 6 | 40 | 60 | 60 | 45 | 6.2 | 1.2 | 40 | 22 | 29 | 17 | 84.6 |
| 7 | 30 | 71 | 70.3 | 53 | 5.5 | 1.2 | 37 | 16 | 22 | 16 | 91.4 |
| 8 | 24 | 83 | 77.6 | 61 | 5.4 | 1.2 | 36 | 15 | 20 | 11 | 98.9 |
| 9 | 11 | 91 | 89.2 | 77 | 4.1 | 1.2 | 41 | 10 | 13 | 9 | 110.8 |
| 10 | 0 | 100 | 100 | 100 | 3.8 | 1.1 | — | 14 | 14 | 9 | 118.3 |

Tracking Monomer Conversion vs. Time

General Procedure: A 2 dram vial containing a magnetic stirbar and p-OMeTPT (5, 1.6 mg, 0.003 mmol, 0.07 equivs) was taken into a glovebox maintained under nitrogen atmosphere. To this vial were added the desired monomer (4.5 mmol 100 equiv). Dichloromethane (2 mL) was added, followed by ethyl propenyl ether (5 μL, 0.045 mmol, 1 equiv). The vial was capped, removed from the glovebox, and irradiated with blue LEDs (λ=450-480 nm). Aliquots were removed at the designated time points by opening the vial under a heavy cone of $N_2$ and diluted with $CDCl_3$ saturated with hydroquinone for $^1$H-NMR analysis. Time points refer to the total amount of irradiation time experienced by the sample.

TABLE 5

Conversion vs. time data for monomers 2, 6, 7, and 8.

| Time (min.) | 2 | 6 | 7 | 8 |
|---|---|---|---|---|
| 1 | 2% | 4% | 7% | 15% |
| 3 | 5% | 5% | 17% | 33% |
| 6 | 7% | 8% | 26% | 53% |
| 10 | 11% | 9% | 34% | 70% |
| 15 | 14% | 12% | 41% | 78% |
| 20 | 15% | 15% | 45% | 85% |
| 25 | 18% | 17% | 49% | 88% |
| 30 | 19% | 20% | 50% | 90% |
| 40 | 24% | 21% | 51% | 93% |
| 50 | 25% | 22% | 53% | 96% |
| 75 | 28% | 22% | 54% | 96% |

UV-Promoted Thiol-ene Crosslinking of Polynorbornene Derivatives

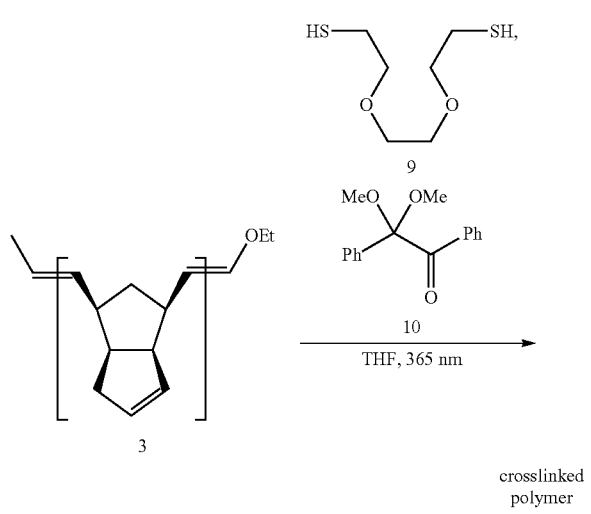

General Procedure: To a vial containing the polymer dissolved in THF which had been filtered over neutral alumina and then sparged with $N_2$ (100 mg/mL) was added 2,2'-(Ethylenedioxy)diethanethiol (9, 0.25 equiv based on monomer molecular weight) and 2,2-dimethoxy-2-phenylacetophenone (0.1 equiv based on monomer molecular weight). The vial was irradiated using a handheld UV lamp (4 W, λ=365 nm) without stirring for 30 minutes. The solution was observed to have formed a gel and no longer flowed when the vial was inverted.

Thus, Example 3 demonstrates the ability to prepare linear, non-crosslinked polydicyclopentadiene using a photoredox-mediated organic-initiated ROMP procedure. The monomer, endo-DCPD, can also be copolymerized with norbornene to prepare polymers with varied amounts of cyclopentene units. The low conversion observed with this monomer was found to be due to the presence of the additional olefin moiety, and two partially hydrogenated monomers were shown to reach high conversion under the polymerization conditions. Finally, the ability to crosslink the polyDCPD was demonstrated in a manner that avoids metal-based reagents throughout the entire process.

Example 4. Polymerization of Silyl Ether-Containing Monomers and Deprotection of Resulting Polymers Polymerization

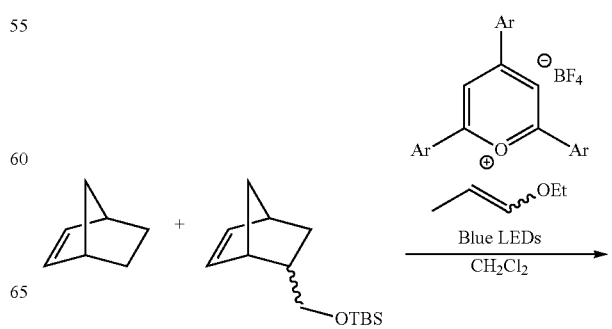

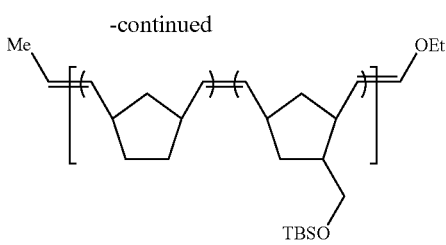

A vial containing 2,4,6-tris(4-methoxyphenyl)pyrylium tetrafluoroborate (1.5 mg, 0.003 mmol) and a stirbar was taken into an inert atmosphere glovebox. Norbornene (324.3 mg, 3.44 mmol) was added, followed by bicyclo[2.2.1]hept-5-en-2-yl)methoxy)(tert-butyl)dimethylsilane (273.0 mg, 1.14 mmol), dichloromethane (2 mL), and ethyl propenyl ether (5 μL, 0.045 mmol). The vial was sealed and removed from the glovebox. The vial was irradiated with blue LEDs for 2 hours. The reaction mixture was filtered over neutral alumina using dichloromethane. The polymer was precipitated into methanol to give the final polymer (260.0 mg, 44% yield) as a white, fluffy solid. NMR analysis showed that the TBS ether content was ~17%.

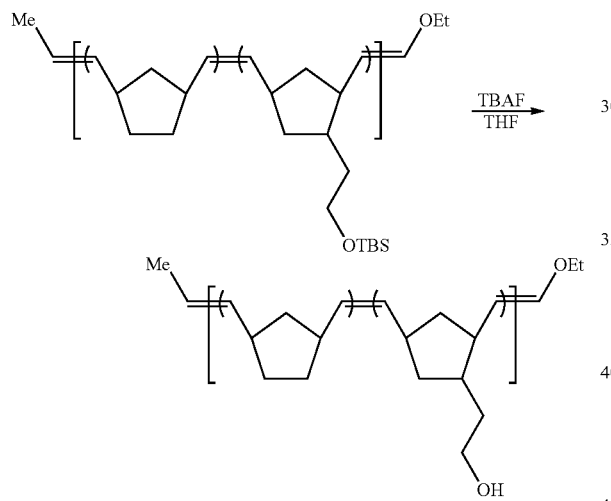

Deprotection

To a solution of the TBS ether containing polymer (99.5 mg) in THF (8 mL) at 0° C. was added tetra-n-butylammonium fluoride (TBAF, 1.0M in THF, 200 μL). After 3 hours, the reaction was concentrated, and the residue washed repeatedly with methanol to provide the final polymer (49.5 mg).

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of making a polymer comprising:
exposing a reaction mixture comprising a strained cyclic unsaturated monomer and an organic initiator to a stimulus to provide an activated organic initiator, whereby the activated organic initiator is effective to polymerize the strained cyclic unsaturated monomer via a 4-membered carbocyclic intermediate, to provide a polymer having constitutional units derived from the strained cyclic unsaturated monomer.

2. The method of claim 1, wherein the organic initiator is metal-free or is an organic unsaturated initiator.

3. The method of claim 2, wherein the organic unsaturated initiator comprises one or more electron-donating substituents in electronic conjugation with an unsaturated bond, and the electron-donating substituent is selected from $C_{1-20}$ alkoxy, aryloxy, $C_{1-20}$ alkyl-NH—, aryl-NH—, $C_{1-20}$ alkyl-S—, and aryl-S—.

4. The method of claim 2, wherein the organic unsaturated initiator is a compound of Formula (I)

wherein $R_1$ is selected from hydrogen, $C_1$-$C_{20}$ alkyl, $C_2$-$C_{20}$ alkenyl, aryl, and heteroaryl groups; and $R_2$ is selected from $C_1$-$C_{20}$ alkyl, cycloalkyl, aryl, and heteroaryl groups.

5. The method of claim 2, wherein the organic unsaturated initiator is selected from

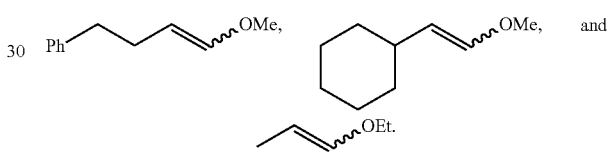

6. The method of claim 1, wherein the organic initiator is an organic photoinitiator selected from

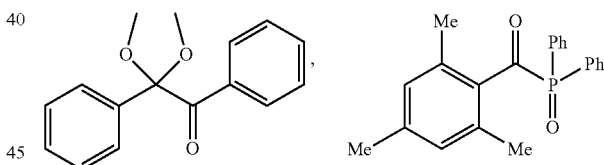

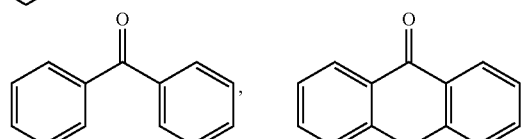

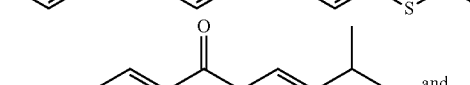

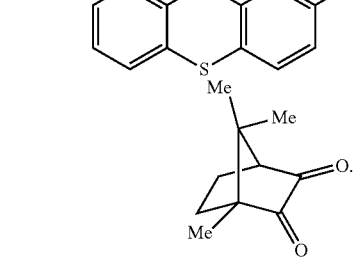

7. The method of claim 1, further comprising oxidizing the organic initiator.

8. The method of claim 1, wherein the reaction mixture further comprises an oxidizing agent, a mediator, or both an oxidizing agent and a mediator.

9. The method of claim 8, wherein the mediator is selected from pyrylium salts, acridinium salts, thiopyrylium salts, and 2,3-dichloro-5,6-dicyano-1,4-benzoquinone.

10. The method of claim 1, wherein the polymerization is conducted under ambient atmosphere.

11. The method of claim 1, wherein the stimulus is selected from ultraviolet light, visible light, heat, and an electric potential.

12. The method of claim 1, wherein the strained cyclic unsaturated monomer has a ring strain of at least 20 kcal/mol.

13. The method of claim 12 wherein the strained cyclic unsaturated monomer is a strained cycloalkene selected from norbornene, cyclobutene, cyclooctene, cyclodecene, and cyclododecatriene.

14. The method of claim 13, wherein the strained cycloalkene is selected from

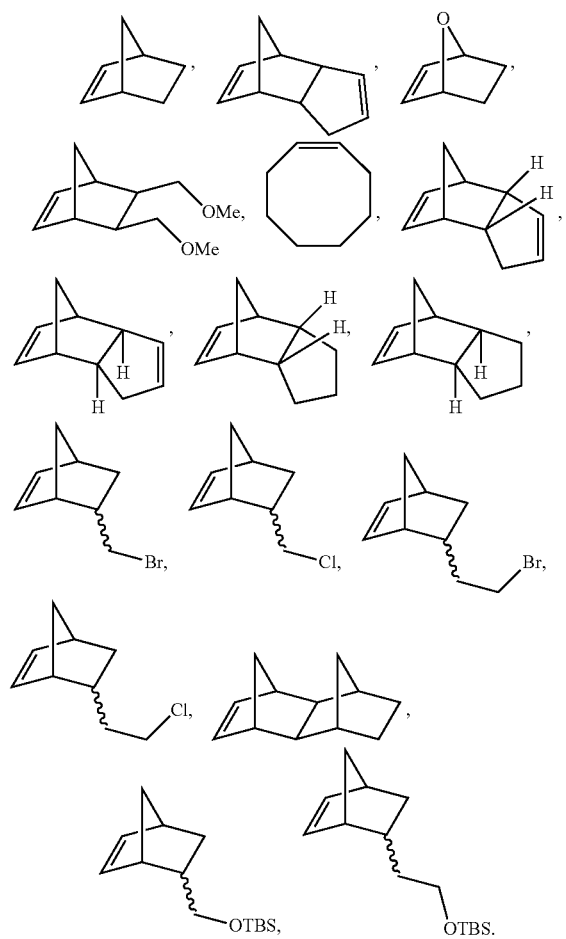

15. The method of claim 1, further comprising crosslinking the polymer.

16. The method of claim 15, wherein crosslinking the polymer comprises reacting the polymer with a crosslinker selected from

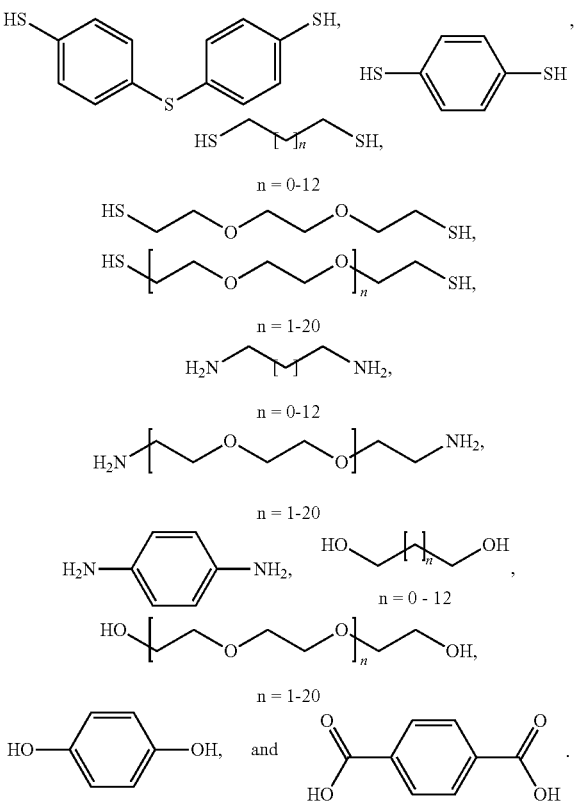

17. A method of making a polymer comprising:

exposing a reaction mixture comprising a strained cyclic unsaturated monomer, an organic unsaturated initiator, and a co-initiator, to a stimulus to provide an activated co-initiator which activates the organic unsaturated initiator, whereby the activated organic unsaturated initiator is effective to polymerize the strained cyclic unsaturated monomer via a 4-membered carbocyclic intermediate, to provide a polymer having constitutional units derived from the strained cyclic unsaturated monomer.

18. The method of claim 17, wherein the co-initiator is selected from pyrylium salts, acridinium salts, thiopyrylium salts, 2,3-dichloro-5,6-dicyano-1,4-benzoquinone, persulfate salts.

19. The method of claim 17, wherein the co-initiator is selected from

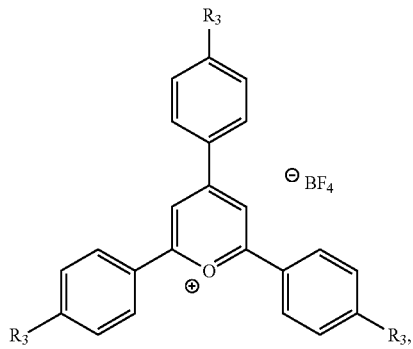

-continued
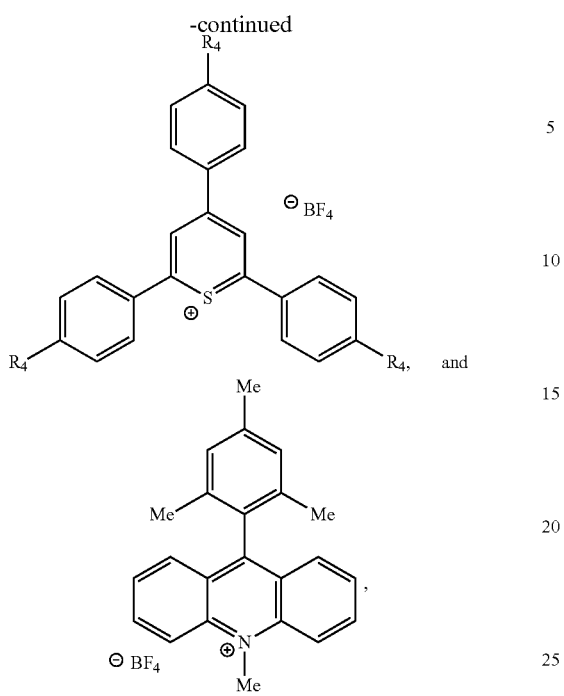
wherein R₃ and R₄ is each independently selected from H, C1-6 alkyl, C1-6 alkoxy, and aryl.
20. The method of claim 17, wherein the co-initiator is selected from $Na_2SO_5$, $KHSO_5$, $Na_2S_2O_8$, and $(NH_4)_2S_2O_8$.
* * * * *